US012606343B2

(12) United States Patent
Drouet

(10) Patent No.: US 12,606,343 B2
(45) Date of Patent: Apr. 21, 2026

(54) CUP, A BLANK FOR A CUP AND A METHOD OF FORMING A CUP

(71) Applicant: Choose Planet A Limited, Hong Kong (CN)

(72) Inventor: Cyril Michel Drouet, Hong Kong (CN)

(73) Assignee: Choose Planet A Limited, Jordan (HK)

( * ) Notice: Subject to any disclaimer, the term of this patent is extended or adjusted under 35 U.S.C. 154(b) by 0 days.

(21) Appl. No.: 19/232,539

(22) Filed: Jun. 9, 2025

(65) Prior Publication Data

US 2025/0304312 A1 Oct. 2, 2025

Related U.S. Application Data

(63) Continuation of application No. 18/824,810, filed on Sep. 4, 2024, which is a continuation of application
(Continued)

(30) Foreign Application Priority Data

Oct. 17, 2019 (CN) ............................... 191331129.9

(51) Int. Cl.
*B65D 5/02* (2006.01)
*B31B 50/73* (2017.01)
(Continued)

(52) U.S. Cl.
CPC .......... *B65D 5/0254* (2013.01); *B31B 50/732* (2017.08); *B65D 5/0209* (2013.01);
(Continued)

(58) Field of Classification Search
CPC .............. B31B 50/732; B31B 2100/00; B31B 2120/10; B65D 3/04; B65D 3/06;
(Continued)

(56) References Cited

U.S. PATENT DOCUMENTS

| | | | | |
|---|---|---|---|---|
| 4,498,585 A | | 2/1985 | Gordon et al. | |
| 4,714,164 A | * | 12/1987 | Bachner .................. | B65D 5/06 493/63 |

(Continued)

FOREIGN PATENT DOCUMENTS

| | | | |
|---|---|---|---|
| CN | 204223350 U | * | 3/2015 |
| CN | 204223351 U | * | 3/2015 |

(Continued)

OTHER PUBLICATIONS

Chinese Re-Examination Decision from coresponding Chinese Patent Application No. 202080073103.4 dated Apr. 17, 2025, 1 page.

(Continued)

*Primary Examiner* — Bryon P Gehman
(74) *Attorney, Agent, or Firm* — Lee & Hayes, P.C.

(57) ABSTRACT

A system and a method for a cup for retaining a liquid. The system includes a base and a wall. The base and the wall define a container with a space to retain the liquid. A first closure flap and a second closure flap are attached to the wall and extend from the wall. The first closure flap and the second closure flap are foldable relative to the wall. The first closure flap and the second closure flap are foldable between an open position and a closed position. The first closure flap and the second closure flap define a lid when in the closed position. The lid is defined by the first closure flap being folded at least twice to a closed position and the second closure flap being folded at least once to a closed position.

20 Claims, 18 Drawing Sheets

Related U.S. Application Data

No. 18/388,791, filed on Nov. 10, 2023, now Pat. No. 12,286,279, which is a continuation of application No. 17/769,499, filed as application No. PCT/CN2020/121419 on Oct. 16, 2020, now abandoned.

(51) Int. Cl.

| | |
|---|---|
| ***B65D 5/12*** | (2006.01) |
| ***B65D 5/40*** | (2006.01) |
| ***B65D 5/72*** | (2006.01) |
| *B31B 100/00* | (2017.01) |
| *B31B 120/10* | (2017.01) |

(52) U.S. Cl.

CPC ................. *B65D 5/12* (2013.01); *B65D 5/40* (2013.01); *B65D 5/72* (2013.01); *B31B 2100/00* (2017.08); *B31B 2120/10* (2017.08)

(58) Field of Classification Search

CPC ... B65D 3/08; B65D 3/20; B65D 5/02; B65D 5/0209; B65D 5/0254; B65D 5/12; B65D 5/18; B65D 5/40; B65D 5/42; B65D 5/4266; B65D 5/46; B65D 5/64; B65D 5/72; B65D 5/74; B65D 65/42; B65D 81/38; B65D 81/48

See application file for complete search history.

(56) References Cited

U.S. PATENT DOCUMENTS

| | | | | |
|---|---|---|---|---|
| 5,676,306 | A * | 10/1997 | Lankin ..................... | B65D 3/20 229/5.5 |
| 7,726,551 | B2 * | 6/2010 | Abbott ..................... | B65D 3/06 229/5.5 |
| 9,737,161 | B1 * | 8/2017 | Li ............................ | B65D 3/08 |
| 10,492,633 | B2 * | 12/2019 | Li ............................ | B65D 3/06 |
| 10,919,662 | B2 | 2/2021 | Maldonado Barragan | |
| 11,130,609 | B2 | 9/2021 | Aittamaa | |
| D1,080,377 | S * | 6/2025 | Leeds ............................ | D9/431 |
| 2018/0070750 | A1 * | 3/2018 | Li ............................ | B65D 3/08 |
| 2019/0077536 | A1 | 3/2019 | Chan et al. | |
| 2021/0094720 | A1 * | 4/2021 | Chan ........................ | B65D 3/20 |

FOREIGN PATENT DOCUMENTS

| | | | | |
|---|---|---|---|---|
| CN | 204250529 | U * | 4/2015 | |
| EP | 2949602 | A3 * | 12/2015 | ............... B65D 3/20 |
| GB | 2380397 | A * | 4/2003 | ............... B65D 3/20 |
| KR | 20050043450 | A * | 5/2005 | |
| KR | 101380304 | B1 * | 4/2014 | |

OTHER PUBLICATIONS

JP Notice of Reasons for Refusal for corresponding JP Patent Application No. 2022 522678 dated May 7, 2025, 6 pages.

Korean Office Action for coresponding Korean Patent Application No. 10-2022-7016461 dated May 16, 2025, 15 pages.

Office Action for U.S. Appl. No. 18/824,810, dated Oct. 21, 2025, 8 pages.

Examination Report for AU Application No. 2020366478, Dated Aug. 28, 2025, 4 pages.

* cited by examiner

CUP, A BLANK FOR A CUP AND A METHOD OF FORMING A CUP

RELATED APPLICATIONS

This application is a continuation of and claims priority to U.S. application Ser. No. 18/824,810, filed Sep. 4, 2024, which is a continuation of and claims priority to U.S. application Ser. No. 18/388,791, filed Nov. 10, 2023, now patented as U.S. Pat. No. 12,286,279, which is a continuation of and claims priority to U.S. application Ser. No. 17/769,499, filed Apr. 15, 2022, which claims priority to PCT Application No. PCT/CN2020/121419, filed Oct. 16, 2020, which claims priority to CN Patent Application No. 19131129.9, filed Oct. 17, 2019, the contents of each of which is incorporated herein by reference.

TECHNICAL FIELD

The present invention relates to a cup, and particularly, although not exclusively, to a cup with a closable lid.

BACKGROUND

Disposable items are common in today's society. Disposable Cups such as paper cups or plastic cups are commonly used today in the food and beverage industry. These disposable items are often discarded or recycled after a single or limited use.

Food and drink cups are often provided with a separate lid to render the cup spill proof. These lids are often separate parts that are placed onto and secured to the cup after the cup is filled with liquid or solids e.g. drinks or food. The lid may then be removed by a user to access the drink or food, after which the lid may then be discarded or recycled along with the cup.

These separable lids often have to be processed e.g. recycled separate to the rest of the cup because they are made of a different material.

In many instances, the lids are often made from plastic which can be recycled but at greater costs compared with the cup.

Additionally, these removable lids can have some practical difficulties for the end user as they can often be incorrectly positioned onto the cup and in turn cause the cup to leak. In use, end users may need to make extra effort to correctly attach the lid to the cup such as by accurately aligning the lid with an upper edge of the cup whilst exerting an even force to ensure the lid is fitted to the edge of the cup. If the lid is not correctly positioned or misaligned, spillage can occur when a user is using the cup.

SUMMARY OF THE INVENTION

The present invention relates to a cup, and particularly, but not exclusively, to a cup with a closable lid. The present invention also relates to a blank for a cup and a method of forming a cup.

In accordance with a first aspect the present invention relates to a cup for retaining a liquid comprising:

- a base,
- a wall,
- the base and the wall defining a container with a space to retain the liquid,
- a first closure flap and a second closure flap, the first closure flap and second closure flap attached to the wall and extending from the wall,
- the first closure flap and the second closure flap being foldable relative to the wall, the first closure flap and second closure flap foldable between an open position and a closed position, wherein the first closure flap and the second closure flap defining a lid when in the closed position, and;
- the lid being defined by a first closure flap being folded at least twice to a closed position and the second closure flap being folded at least once to a closed position.

In one configuration the cup comprises a first transverse fold feature, the first closure flap attached to the wall at the first transverse fold feature, and the first closure flap comprises a pair of opposed oblique fold features defined on the first closure flap.

In one configuration the first closure flap is folded twice and the second closure flap is folded once to close the flaps, wherein the first closure flap is folded along the pair of oblique fold features and folded along the first transverse fold feature to move the first closure flap to a closed position, and the second closure flap is folded along a second transverse fold feature to a closed position.

In one configuration the first closure flap comprises a pair of opposing side flaps and an intermediate flap extending between the side flaps, each side flap attached to the intermediate flap along a longitudinal fold feature, each side flap is attached to the wall at a side fold feature, and the intermediate flap attached to the wall at the first transverse fold feature.

In one configuration the intermediate flap is attached to the wall along the first transverse fold feature, each side flap is attached to the wall along a side fold feature.

In one configuration each side flap comprises an arcuate edge and the intermediate flap comprises a curved edge, wherein the arcuate edge of each side flap comprising a first curved portion and a second curved portion defining the arcuate edge.

In one configuration each side flap comprises a distal panel and a proximal panel, the proximal panel of each side flap proximal to the intermediate flap and the distal panel distal to the intermediate panel; and the oblique fold feature on each side flap separating the proximal panel and the distal panel.

In one configuration each side flap folds about the side fold feature and the proximal panel folds about the oblique fold feature to be positioned on top of the distal panel to define the two folds of the first closure flap.

In one configuration the first transverse fold feature and the second transverse fold feature is a curved edge.

In one configuration the first closure flap comprises a locking opening, the second closure flap comprises a locking tab and the second closure flap rests on top of the first closure flap when the first closure flap and second closure flap are in the closed position, and the locking tab of the second closure flap engaged into the locking opening of the first closure flap to lock the first and second closure flaps in a closed position.

In one configuration the second closure flap is foldable about a second transverse fold feature, wherein the second closure flap is foldable between an open and a closed position, wherein in a closed position the second closure flap rests on top of the first closure flap.

In one configuration the second closure flap is foldable between 0 and 180 degrees about a second transverse fold feature.

In one configuration the second closure flap is in a fully open position when the second closure flap is at 0 degrees and the second closure flap is in a closed position when the second closure flap is at 180 degrees, and wherein the second closure flap is perpendicular to the first closure flap when at 0 degrees and a user can view inside the container when the second closure flap is at 0 degrees.

In one configuration the cup comprises a third transverse fold feature, the third transverse fold feature disposed on the second closure flap, the third transverse fold feature located adjacent the second transverse fold feature, and wherein the second closure flap is foldable about the third transverse fold feature.

In one configuration the second closure flap is moveable between 0 degrees and 90 degrees about the third transverse fold feature.

In one configuration the second transverse fold feature and the third transverse fold features are arcuate fold features.

In one configuration the second transverse fold feature and the third transverse fold feature comprise opposing curvatures.

In one configuration the first closure flap is longer than the second closure flap.

In one configuration the first closure flap folding about the oblique fold features creates a pair of opposing arcuate lips due to an arcuate edge of each side flap of the first closure flap and a transverse lip formed by the arcuate edge of the intermediate flap of the first closure flap, when the first closure flap is folded to a closed position.

In one configuration the pair of opposing arcuate lips and the transverse lip creating sealing structures to prevent the contents of the cup from spilling out when the cup is tipped or tilted to drinking orientation or when the cup is tipped toward the intermediate flap.

In one configuration the wall comprises a first longitudinal edge and a second longitudinal edge, the longitudinal edges are overlapped to form a cylinder or a prism shape and define the container, and wherein at least one of the first longitudinal edge or second longitudinal edge comprises a cut-out within it.

In one configuration the second longitudinal edge comprises a C shaped cut-out therein.

In one configuration the C shaped cut-out is positioned at a side fold feature when the first longitudinal edge and second longitudinal edge are overlapped to form the cylinder or prism, the C shaped cut out improving foldability of each side flap.

In one configuration the first closure flap comprises a curved upper surface and the second closure flap comprises a curved upper surface, the upper surface of the first closure flap and the upper surface of the second closure flap are curved in the same direction.

In one configuration the first closure flap and the second closure flap comprise a concave curvature.

In one configuration the intermediate flap of the first closure flap and the second closure flap comprise a concave curvature.

In one configuration each side fold feature is defined along a straight edge of the wall, and the upper surface of the first closure flap and the upper surface of the second closure flap comprise a concave curvature, and wherein the straight edge at each side allows for easier folding of the flaps since tension on the flaps is in one direction.

In one configuration audible feedback or tactile feedback is provided when the locking tab is engaged into the locking opening and/or an audible feedback or tactile feedback is provided when the locking tab is disengaged from the locking opening.

In configuration the audible feedback comprises an audible click being generated due to the curved upper surface of the first closure flap and a curved upper surface of the second closure flap.

In one configuration the locking tab is disengaged from the locking opening by a force being exerted on an upper surface of the first closure flap or an upper surface of the intermediate flap.

In one configuration the first closure flap comprises an outlet opening formed on the first closure flap.

In one configuration the cup comprises a foldable cover, the cover moveable between a closed position and an open position, the outlet opening being exposed when the cover is in an open position such that contents of the cup can exit the outlet opening and the outlet opening being covered by the cover when the cover is in a closed position such that the contents of the cup are retained within the cup.

In one configuration, the second closure flap is foldable to form a lip arranged for a user to access the liquid retained within the space.

In one configuration cover is biased to a closed position due to the concave curvature of the upper surface of the first closure flap.

According to a second aspect the present invention relates to a blank for a cup, the blank comprising:

- a wall,
- a first closure flap attached to the wall and extending from the wall, a second closure flop attached to the wall and extending from the wall,
- the first closure flap and second closure flap being integrally formed with the wall, the blank being a one piece construction,
- the first closure flap comprising a pair of opposed arcuate edges and an intermediate edge extending between the arcuate edges,
- the first closure flap comprising two oblique fold features,
- the first closure flap attached to the wall at a first transverse fold feature,
- the second closure flap attached to the wall at a second transverse fold feature,
- wherein in use, the first closure flap is foldable first about at least the oblique fold features and foldable about the first transverse fold feature, the second closure flap foldable about the second transverse fold feature, and a lid being formed by the first closure flap being folded twice and the second closure flap being folded once.

In one configuration the blank comprises a third transverse fold feature disposed on the second closure flap, the second closure flap being foldable about the third transverse fold feature and/or the second transverse fold feature, and wherein the second transverse fold feature and the third transverse are curved.

In one configuration the third transverse fold feature and second transverse fold feature comprise opposing curvatures.

In one configuration the third transverse fold feature comprises a convex curvature and the second transverse fold feature comprises a concave curvature.

In one configuration the first closure flap comprises a first side flap, a second side flap, an intermediate flap extending between and connecting the first side flap and the second side flap, the intermediate flap attached to the wall along the first transverse fold feature, each side flap attached to the wall at a side fold feature, and each side flap comprising an arcuate edge and the intermediate flap comprising a curved edge, the curved edge connecting each arcuate edge.

In one configuration each arcuate edge comprises a first curved portion and a second curved portion, the first curved portion and second curved portion comprising different curvatures or different arc lengths or different radiuses.

In one configuration the wall comprises a first longitudinal edge and a second longitudinal edge, the longitudinal edges are opposed to each other and bound the wall, wherein either the first longitudinal edge or the second longitudinal edge comprises a cut out.

According to a third aspect the present invention relates to a method of forming a cup using a blank, wherein the blank comprises a wall, the wall comprising a first longitudinal edge and a second longitudinal edge, the blank further comprising a first closure flap attached to the wall and extending from the wall, a second closure flop attached to the wall and extending from the wall, the first closure flap and second closure flap being integrally formed with the wall, the blank being a one piece construction, the first closure flap comprising a pair of opposed arcuate edges and an intermediate edge extending between the arcuate edges, the first closure flap comprising two oblique fold features, the first closure flap attached to the wall at a first transverse fold feature, the second closure flap attached to the wall at a second transverse fold feature, the method comprising the steps of:

attaching a portion of the wall adjacent the second longitudinal edge to a portion of the wall adjacent the first longitudinal edge to form a cylinder or prism shaped body, the cylinder or prism shaped body defining a hollow space therein to define a container, forming a base or attaching a base, forming a lid by folding the first closure flap along at least the two oblique fold features to fold two portions of the first closure flap inward, folding the first closure flap about the first transverse fold feature such that the first closure flap is in a closed position, folding the second closure flap about the second fold feature such that the second closure flap rests on top of the first closure flap in a closed position, the first closure flap and second closure flap being folded to form a lid, the second closure flap comprising a locking tab and the first closure flap comprising a locking opening, and inserting the locking tab into the locking opening to lock the second closure flap to the first closure flap and form a closed lid that prevents or reduces leakage of the contents of the cup.

In accordance with another aspect of the present invention, there is provided a disposable beverage cup for use with an electric beverage dispenser comprising:

a base, a wall, the base and the wall defining a container with a space to retain the beverage, a first closure flap and a second closure flap, the first closure flap and second closure flap attached to the wall and extending from the wall, the first closure flap and the second closure flap being foldable relative to the wall, the first closure flap and second closure flap foldable between an open position and a closed position, wherein the first closure flap and the second closure flap defining a lid when in the closed position;

the lid being defined by a first closure flap being folded at least twice to a closed position and the second closure flap being folded at least once to a closed position;

wherein the base and the wall are suitably dimensioned for the beverage cup to stand approximately 15 cm tall or near the height of a dispensing position of a beverage dispenser such that one of the first or second closure flap, in an open position is arranged to fit within a slot between a wall and nozzle of the beverage dispenser;

wherein the cup comprises a first transverse fold feature, the first closure flap attached to the wall at the first transverse fold feature, and the first closure flap comprises a pair of opposed oblique fold features defined on the first closure flap;

wherein the first closure flap is folded twice and the second closure flap is folded once to close the flaps, wherein the first closure flap is folded along the pair of oblique fold features and folded along the first transverse fold feature to move the first closure flap to a closed position, and the second closure flap is folded along a second transverse fold feature to a closed position;

wherein the first closure flap comprises a pair of opposing side flaps and an intermediate flap extending between the side flaps, each side flap attached to the intermediate flap along a longitudinal fold feature, each side flap is attached to the wall at a side fold feature, and the intermediate flap attached to the wall at the first transverse fold feature;

wherein the intermediate flap is attached to the wall along the first transverse fold feature, each side flap is attached to the wall along a side fold feature;

wherein each side flap comprises an arcuate edge and the intermediate flap comprises a curved edge, wherein the arcuate edge of each side flap comprises a first curved portion and a second curved portion defining the arcuate edge;

wherein each side flap comprises a distal panel and a proximal panel, the proximal panel of each side flap proximal to the intermediate flap and the distal panel distal to the intermediate panel; and the oblique fold feature on each side flap separating the proximal panel and the distal panel;

wherein each side flap folds about the side fold feature and the proximal panel folds about the oblique fold feature to be positioned on top of the distal panel to define the two folds of the first closure flap;

wherein the first transverse fold feature and the second transverse fold feature is a curved edge;

wherein the first closure flap comprises a locking opening, the second closure flap comprises a locking tab and the second closure flap rests on top of the first closure flap when the first closure flap and second closure flap are in the closed position, and the locking tab of the second closure flap engaged into the locking opening of the first closure flap to lock the first and second closure flaps in a closed position;

wherein the second closure flap is foldable about a second transverse fold feature, wherein the second closure flap is foldable between an open and a closed position, wherein in a closed position the second closure flap rests on top of the first closure flap; wherein the second closure flap is foldable between 0 and 180 degrees about a second transverse fold feature;

wherein the second closure flap is in a fully open position when the second closure flap is at 0 degrees and the second closure flap is in a closed position when the second closure flap is at 180 degrees, and wherein the second closure flap is perpendicular to the first closure flap when at 0 degrees and a user can view inside the container when the second closure flap is at 0 degrees to determine the level of beverage is in the cup;

wherein the cup comprises a third transverse fold feature, the third transverse fold feature disposed on the second closure flap, the third transverse fold feature located adjacent the second transverse fold feature, and wherein the second closure flap is foldable about the third transverse fold feature;

wherein the second closure flap is moveable between 0 degrees and 90 degrees about the third transverse fold feature;

wherein the second transverse fold feature and the third transverse fold features are arcuate fold features;

wherein the second transverse fold feature and the third transverse fold feature comprise opposing curvatures;

wherein the first closure flap is longer than the second closure flap; wherein the first closure flap folding about the oblique fold features creates a pair of opposing arcuate lips due to an arcuate edge of each side flap of the first closure flap and a transverse lip formed by the arcuate edge of the intermediate flap of the first closure flap, when the first closure flap is folded to a closed position;

wherein the pair of opposing arcuate lips and the transverse lip creating sealing structures to prevent the beverage of the cup from spilling out when the cup is tipped or tilted to drinking orientation or when the cup is tipped toward the intermediate flap;

wherein the first closure flap comprises a curved upper surface and the second closure flap comprises a curved upper surface, the upper surface of the first closure flap and the upper surface of the second closure flap are curved in the same direction;

wherein the first closure flap and the second closure flap comprise a concave curvature;

wherein the intermediate flap of the first closure flap and the second closure flap comprise a concave curvature;

wherein each side fold feature is defined along a straight edge of the wall, and the upper surface of the first closure flap and the upper surface of the second closure flap comprise a concave curvature, and wherein the straight edge at each side allows for easier folding of the flaps since tension on the flaps is in one direction;

wherein audible feedback or tactile feedback is provided when the locking tab is engaged into the locking opening and/or an audible feedback or tactile feedback is provided when the locking tab is disengaged from the locking opening;

wherein the audible feedback comprises an audible click being generated due to the curved upper surface of the first closure flap and a curved upper surface of the second closure flap;

wherein the locking tab is disengaged from the locking opening by a force being exerted on an upper surface of the first closure flap or an upper surface of the intermediate flap;

wherein the first closure flap comprises an outlet opening formed on the first closure flap;

wherein the cup further comprises a foldable cover, the cover moveable between a closed position and an open position, the outlet opening being exposed when the cover is in an open position such that beverage of the cup can exit the outlet opening and the outlet opening being covered by the cover when the cover is in a closed position such that the beverage of the cup are retained within the cup;

wherein the second closure flap is foldable to form a lip arranged for a user to access the liquid retained within the space.

This aspect of the present invention may be advantageous as the beverage cup or container may be used in a commercial or large scale hospitality environment, such as in a coffee shop or fast food kitchen. In these environments, beverage dispensers, such as coffee machines or soft drink machines are sized accordingly and may have a nozzle which extends downwards towards the base of a filling platform in which the cup is normally rested whilst it is filled. In this example, when the flaps are in an open position, the flaps may engage with a slot between the wall of the dispenser and the nozzle and thus allowing the cup to fit within the filling platform of the dispenser whilst the nozzle can direct the beverage into the cup. The opening permits an operator to see the filling progress of the cup, whilst the fitting of the flaps within the slot, if at the appropriate height, will assist in retaining the cup in the beverage dispensing machine should it accidently be knocked out of position. In turn, reducing the risk of accidents and spills.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

It should be understood that alternative embodiments or configurations may comprise any or all combinations of two or more of the parts, elements or features illustrated, described or referred to in this specification.

As used herein the term ‘and/or’ means ‘and’ or ‘or’, or where the context allows both.

As used herein “(s)” following a noun means the plural and/or singular forms of the noun.

In this specification the term “cup” comprises cups or other receptacles or containers with an approximately circular or polygon base and a wall extending from the base and having a cylindrical shape or a polygon prism shape and forming a space to hold a liquids and/or solids e.g. food and/or drinks. Additionally, in this specification, the term “liquid” may include any fluid of any viscosity and may also be expanded to include solids such as a collection of fine or large particles such as, but not limited to, sugar crystals, salt crystals, candy or spice pieces or the like. Thus in this specification, the term “liquid” can be considered to be any content, in fluid or solid form, that may be accessible or otherwise poured from the cup.

Also, it is noted that at least some embodiments may be described as a method (i.e. process) that is depicted as a flowchart, a flow diagram, a structure diagram, or a block diagram. Although a flowchart may describe the operations as a sequential method, many of the operations can be performed in parallel or concurrently. In addition, the order of the operations may be rearranged. A method (i.e. process) is terminated when its operations are completed.

In this specification, the word “comprising” and its variations, such as “comprises”, has its usual meaning in accordance with International patent practice. That is, the word does not preclude additional or unrecited elements, substances or method steps, in addition to those specifically recited. Thus, the described apparatus, substance or method may have other elements, substances or steps in various embodiments. The term “comprising” (and its grammatical variations) as used herein are used in the inclusive sense of “having” or “including” and not in the sense of “consisting only of”.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount.

The invention (or inventions) as described herein may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

BRIEF DESCRIPTION OF THE DRAWINGS

Notwithstanding any other forms which may fall within the scope of the present invention, a preferred embodiment will now be described, by way of example only, with reference to the accompanying drawings in which.

DETAILED DESCRIPTION OF THE PREFERRED EMBODIMENTS

Figure 1:
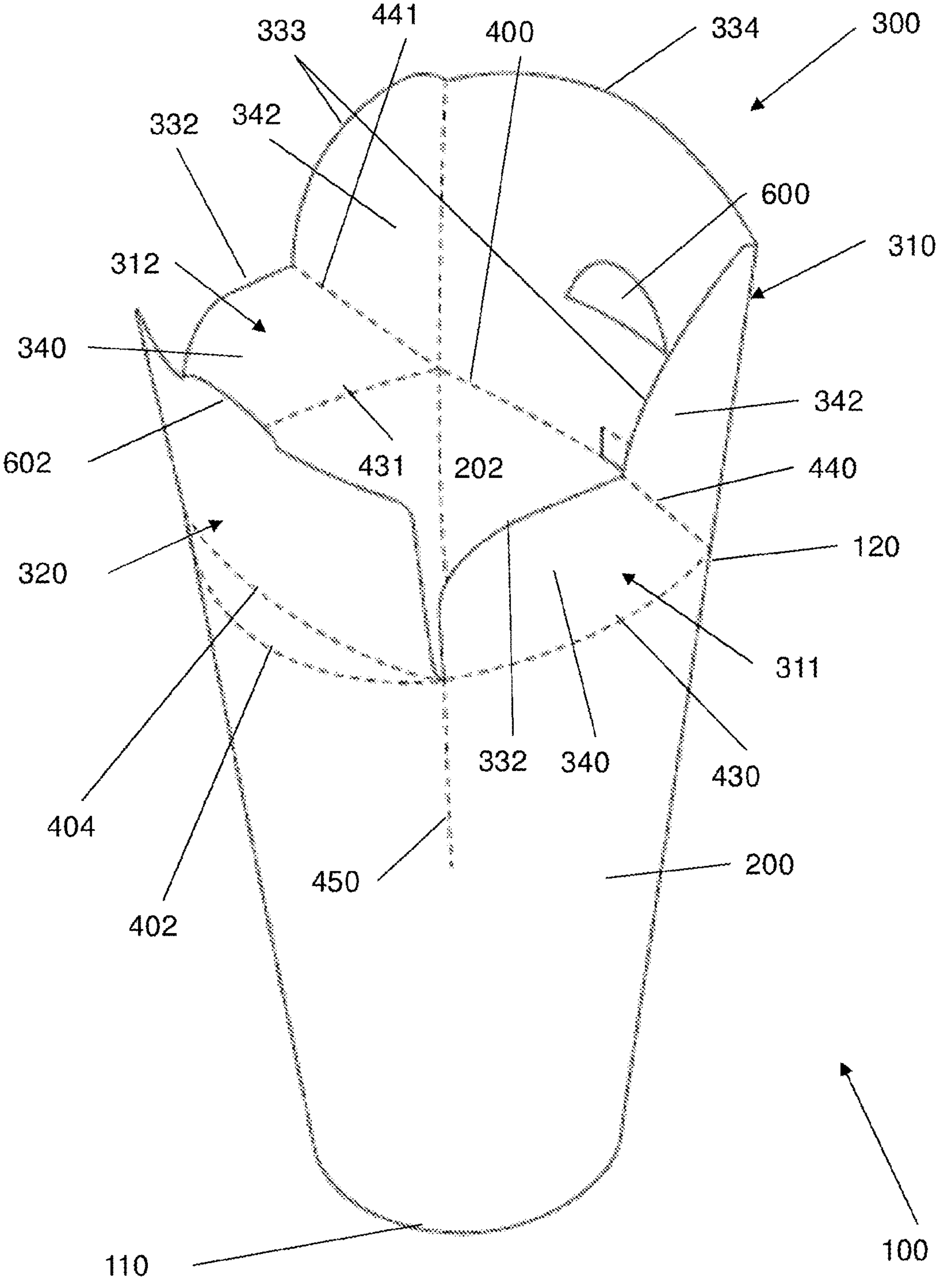
FIG. 1 illustrates an example form of a cup with a lid.

Cups e.g. paper and plastic cups are common place in modern society and are used to hold food and/or drink i.e. hold solids and/or liquids. Cups are often disposable cups that are discarded to landfill or recycled. Commonly used cups often have separate lids that are attached to the cup to seal the cup. The lid can often include an opening to dispense contents of the cup. The lids also have to be disposed to landfill or recycled. The lids are often made of plastic materials that are different to the cup. The lids can be challenging to use because the lid is required to be pushed onto the edge of the cup. This can be challenging and the lid can often incorrectly positioned on to the cup. Further the lid has to be pushed onto the cup with an even force all around the lid in order to correctly secure the lid on to the cup. This can be challenging for people resulting in a misplaced lid or crushing of lids.

The present invention relates to an improved cup. The present invention relates to a cup with a closable and an openable lid. The present invention relates to a cup with an integrated lid that is formed as part of the cup. The lid can be opened and closed easily by folding at least two flaps of the cup to define the lid in a closed position. The integrated lid makes it simpler to close the cup as compared to a separate lid that has to be pushed onto the cup. Further the integrated lid may be reused with along with the cup or may be recycled or disposed with the cup. The integrated lid reduces the number of components and can help to reduce the overall waste produced since there is not present a separate lid to the cup.

The present invention relates to a cup, in particular but not limited to a cup with a closable lid. The cup comprises an integrated lid i.e. a lid that is not a separate piece. The lid is formed as part of the cup.

In one configuration the cup for retaining a liquid or a solid comprises; a base, a wall, the base and the wall defining a container with a space to retain the liquid, a first closure flap and a second closure flap, the first closure flap and second closure flap attached to the wall and extending from the wall, the first closure flap and the second closure flap being foldable relative to the wall, the first closure flap and second closure flap foldable between an open position and a closed position, wherein the first closure flap and the second closure flap defining a lid when in the closed position, and; the lid being defined by a first closure flap being folded at least twice to a closed position and the second closure flap being folded at least once to a closed position.

In one configuration the cup for retaining a liquid or a solid comprises: a base, a wall extending from the base, the wall is defining a cylinder or prism with a hollow space within to retain a liquid or solid, a lid, the lid comprising at least two closure flaps, wherein the lid is moved to a closed position by at least a three fold arrangement, wherein the three fold arrangement comprises folding at least one closure flap once and folding the other flap at least twice. The flap that is folded twice may comprise at least two oblique fold features and a transverse fold feature. The flap is folded along the transverse fold feature first and then the oblique fold features.

In one configuration the cup for retaining a liquid or solid comprises: a base, a wall, the wall and the base defining a container including a hollow space to receive and retain the liquid or solid, a first closure flap and a second closure flap attached to and extending from the wall, the first closure flap and second closure flap being separate from each other (i.e. unconnected to each other), the first closure flap and second closure flap being foldable along fold features between an open position and a closed position, the first and second closure flaps defining a lid that is closed due to the first closure flap and the second closure flap being folded to a closed position, and the first closure flap comprising three edges, the three edges comprising two opposing arcuate edges and an intermediate edge extending between the two arcuate edges. The intermediate edge may comprise a curved edge. The arcuate edges each comprise two arcuate sections, each arcuate section comprising a different arc length. Further the two arcuate sections comprise different radiuses. The two arcuate sections provide additional sealing lips when the first closure flap is folded. The first closure flap may be folded at least twice and the second closure flap is folded at least once to move to a closed position and define a closed lid.

The cup is formed using a blank. The blank defines a wall, a first closure flap and a second closure flap. The blank also comprises a plurality of fold features. The closure flaps can fold along the fold features to fold between an open position and a closed position. The first closure flap comprises at least two oblique fold features. The blank comprises a first transverse fold feature and a second transverse fold feature. The first closure flap associated with the first transverse fold feature to allow the first closure flap to fold along the first transverse fold feature. The second closure flap is associated with the second fold feature to allow the second closure flap to fold along the second fold feature.

In a further form a blank for a cup that is used to form a cup comprises: a wall, a first closure flap attached to the wall and extending from the wall, a second closure flop attached to the wall and extending from the wall, the first closure flap and second closure flap being integrally formed with the wall, the blank being a one piece construction, the first closure flap comprising a pair of opposed arcuate edges and an intermediate edge extending between the arcuate edges, the first closure flap comprising two oblique fold features, the first closure flap attached to the wall at a first transverse fold feature, the second closure flap attached to the wall at a second transverse fold feature, wherein in use, the first closure flap is foldable first about at least the oblique fold features and foldable about the first transverse fold feature, the second closure flap foldable about the second transverse fold feature, and a lid being formed by the first closure flap being folded twice and the second closure flap being folded once. The blank comprises a third transverse fold feature disposed on the second closure flap, the second closure flap being foldable about the third transverse fold feature and/or the second transverse fold feature, and wherein the second transverse fold feature and the third transverse are curved. The third transverse fold feature and second transverse fold feature comprise opposing curvatures.

FIG. 1 illustrates an embodiment of a cup 100 for retaining a liquid or a solid within it. The cup 100 comprises a base 110 and wall 200. The wall 200 is attached to the base and extends upward from the base 110. The wall 200 terminates in a top 120. The top 120 is an open. The wall 200 is an upstanding wall. The wall 200 is a continuous wall and is in the shape of a cylinder or a prism, as shown in FIG. 1. The wall 200 defines a container with a space 202 therein. Liquids or solids or other things can be placed into and retained within the container 202. The wall 200 bounds the space 202. The base 110 is integrated with the wall 200. The base 110 may be formed by bending or folding a lower portion of the wall to form a base. The lower portions that are folded or bent may be adhered together or welded or attached by any other suitable manner to form the base.

Alternatively, the base 110 may be a separate piece that is coupled to a lower region of the wall 200. In this alternative construction the base 110 may be a separate disk shaped piece that is adhered to the lower portion e.g. a lower edge of the wall to form the base 110.

The cup 100 comprises a lid 300. The lid 300 is integrated with the wall 200 and positioned about the top 120. The lid 300 is connected to the wall 200. The lid 300 and the wall 200 may form a monolithic structure. The lid 300 is configured to move between an open position and a closed position. The lid 300 is folded to a closed position and unfolded to an open position. The integrated lid 300 is advantageous because the lid can be easily closed and opened because a user can easily fold and unfold the lid. The user does not need to correctly align the lid with an upper edge of the cup and then apply an even force to secure the lid. Further the integrated lid means the lid cannot be lost.

The lid 300, the wall 200 and the base 110 are all formed from the same material. For example, in one form the cup 100 may be formed from paper or a paper board. In another form the cup 100 (i.e. the base 110, wall 200 and the lid 300) may be formed from a cardboard. In a further form the cup 100 (i.e. the base 110, wall 200 and the lid 300) may be formed from a natural fibre material e.g. jute. In a further form the cup 100 may be formed from a composite material comprising natural fibres and synthetic fibres. In a further form the cup 100 may be formed from a plastics material or a polymer e.g. a thermoplastic polymer. In a further form the cup 100 may be formed from a recycled plastic material or a recyclable plastic material.

In one example construction the material of the cup 100 may be multiply paperboard with at least two overlapping fibrous layers. The multiply paperboard may comprise three or more plies. At least one ply e.g. a middle ply may comprise a chemical pulp or a bleached chemical pulp or a bleached chemi-thermo mechanical pulp. The outer plies may be formed from a bleached pulp. The multiply paperboard may be coated with a suitable coating material to provide heat proofing or strength to the paperboard. For example, liquid barrier or beat proof materials may be added as a coating. Some examples of coatings can comprise a polymeric film or a biopolymer coating, a PE coating, a PP coating or a plant based coating which may be further advantageous as it is fully biodegradable. The material of the cup 100 may also include pigments to provide colour.

The cup may include graphics, logos or other indicia disposed on the cup. For example an outer surface of the wall 200 may comprise a logo or other indicia such that the logo and other indicia is visible to a user. An outer surface or outer face of the lid 300 may comprise a logo, graphics or other indicia that are visible to the user e.g. when a user is drinking from the cup.

The cup 100 may be any suitable size. The cup 100 may be sized to have a volume of between 4 oz to 20 oz. The container i.e. the space 202 may comprise a volume of between 4 oz to 20 oz. For example, the cup 100 may be sized to have a volume of the cup (i.e. the space 202) may be any one of 4 oz, 5 oz, 6 oz, 7 oz, 8 oz, 9 oz, 10 oz, 12 oz, 16 oz, 20 oz. Alternatively the cup 100 may sized and shaped to define any suitable volume. The cup 100 may comprise standard volume sizes.

Figure 2:
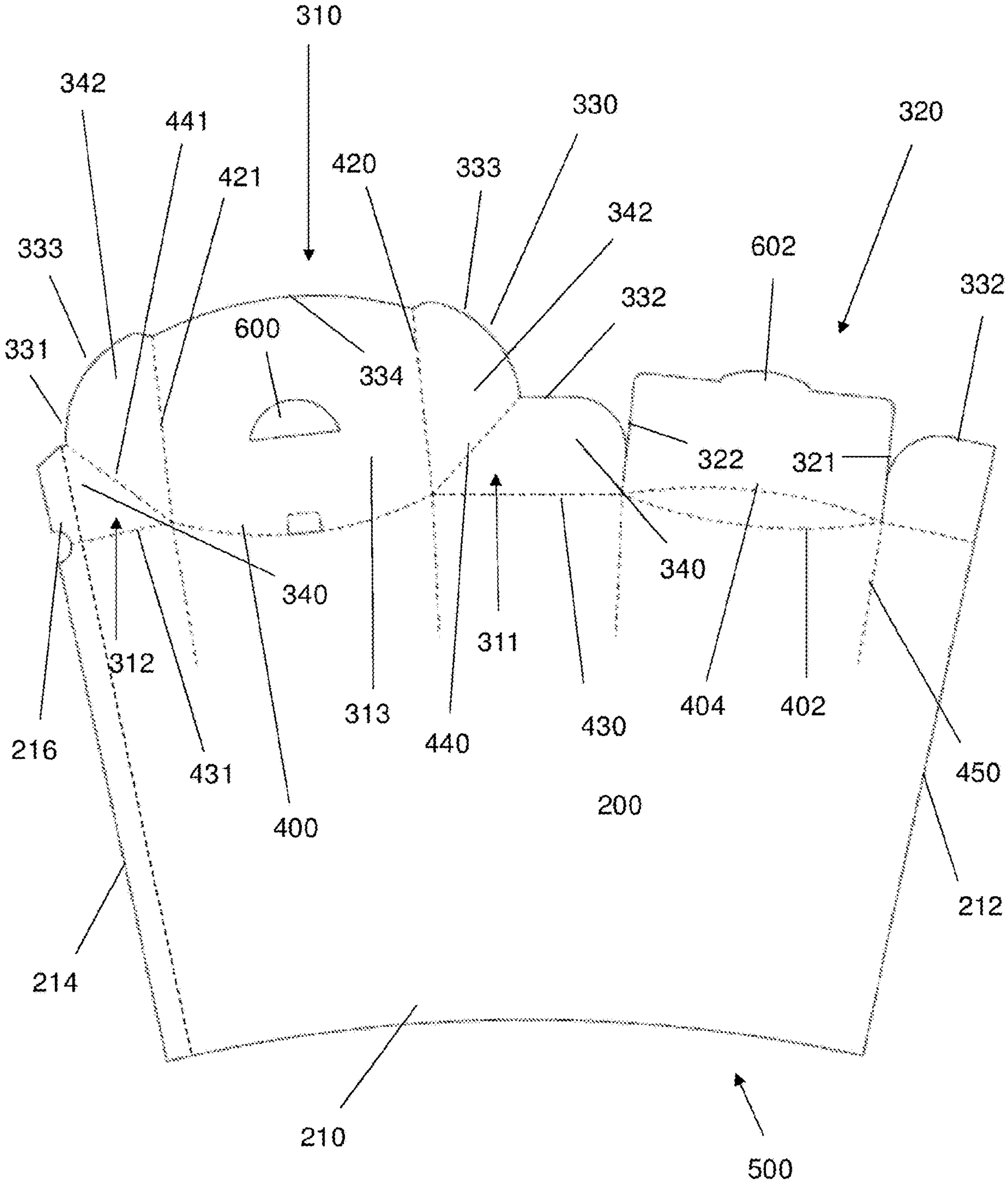
FIG. 2 illustrates an example form of a blank of a cup that is used to create the cup shown in FIG. 1.

The cup 100 may be a truncated cone when the cup 100 is formed from a blank 500 shown in FIG. 2. The cup 200 comprises a frustoconical shape, as shown in FIG. 1. The cup wall 200 may be formed as a tapered cylinder or a tapering prism having a polygon cross section. The wall 200 tapers inward toward the base such that the base 110 is narrower than the top 120. Preferably the wall 200 forms a tapered cylinder. Preferably the base is circular and the top is substantially circular. Preferably, the shape of the cup allows it to be stackable with the base 110 being nestable within the top 120 and thus allowing for a plurality of cups to be stacked together for storage or transportation. Some example configurations of the cup 100 will be described.

In one configuration the cup 100 may comprise a top having a diameter of 62 mm, a height of 62 mm and a base having a diameter 46 mm. In another configuration the cup 100 comprises a top having a diameter of 70 mm, a height of 80 mm and a base with a diameter of 46 mm. In another configuration the cup 100 comprises a base with a diameter of 46 mm, a height of 92 mm and a top with a diameter of 70 mm. In yet another configuration the cup 100 comprises a base with a diameter of 48 mm, a height of 102 mm and a top diameter of 73 mm. In another configuration the cup 100 comprises a base with a diameter of 57 mm, a height of 90 mm and a top having a diameter of 80 mm. In another configuration the cup comprises a base diameter of 60 mm, a height of 95 mm and a top diameter of 90 mm. In another configuration the cup 100 comprises a top diameter of 90 mm, a height of 109 mm and a base diameter of 60 mm. In a further configuration the cup 100 comprises a base of 60 mm, a top diameter of 90 mm and a height of 111 mm. In another configuration the cup 100 comprises a base diameter of 60 mm, a height of 136 mm and a top diameter of 90 mm. In a further configuration the cup 100 comprises a base diameter of 60 mm, a height of 150 m and a top diameter of 90 mm. The cup may be sized according to any one of the described configurations. Alternatively, the cup 100 may comprise any other suitable dimensions.

FIG. 1 illustrates an example form of the cup 100. FIG. 2 illustrates a blank 500 of the cup 100 as shown in FIG. 1. The blank 500 defines a two dimensional form of the cup. The blank 500 is two dimensional form of the cup. The blank 500 is a sheet can be used to cut or stamp or punch out a pattern from a material of the cup. The blank 500 is rolled and folded to form the cup as shown in FIG. 1 and the other figures.

Referring to FIG. 1 and FIG. 2, the cup 100 comprises a first closure flap 310 and a second closure flap 320. The first closure flap 310 and second closure flap 320 are integrally formed with the wall 200, as shown in FIG. 2. The first closure flap 310 and the second closure flap 320 extend outward from the wall 200, as shown in FIG. 1 and FIG. 2. The first closure flap 310, the second closure flap 320 and the wall 200 form a single, continuous structure i.e. a one piece structure. Put another way, the cup (i.e. the closure flaps and the wall) form a monolithic structure. The first closure flap 310 is longer i.e. has a greater height than the second closure flap 320.

As illustrated in FIG. 2, the first closure flap 310 and the second closure 320 extend upward from the wall 200. The first closure flap 310 is attached to the wall 200 via a first transverse fold feature 400. The second closure flap 320 is attached to the wall 200 via a second transverse fold feature 402. The first closure flap 310 is foldable about the first transverse fold feature 400 and the second closure flap 320 is foldable about the second transverse fold feature 402.

The first closure flap 310 comprises a plurality of parts. Referring to FIG. 1 and FIG. 2, the first closure flap comprises a pair of side flaps 311, 312 and an intermediate flap 313. The first closure flap 310 comprises a first side flap 311 and a second side flap 312. The intermediate flap 313 that extends between the side flaps 311, 312. The intermediate flap 313 connects the two side flaps 311, 312. Each side flap 311, 312 is attached on opposing edges of the intermediate flap 313 at a longitudinal fold feature. The first side flap 311 is attached to the intermediate flap 313 at a first longitudinal fold feature 420. The second side flap 312 is attached to the intermediate flap at a second longitudinal fold feature 421. The longitudinal fold features 420, 421 extend vertically on the first closure flap 310.

The first side flap 311 is attached to the wall 200 at a first side fold feature 430. The second side flap 312 is attached to the wall 200 at a second side fold feature 431. The intermediate flap 313 is attached to the wall at the first transverse fold feature 400. The first side flap 311, second side flap 312 and the intermediate flap 313 are formed as a one-piece structure.

Each side flap 311, 312 comprises an arcuate edge. The first side flap 311 comprises a first arcuate edge 330. The second side flap 312 comprises a second arcuate edge 331. The arcuate edges 330, 331 may be identical or substantially similar to each other in size and shape. The side flaps 311, 312 are identical or substantially similar to each other in size and shape. The arcuate edge 330, 331 of each side flap comprises a first curved portion 332 and a second curved portion 333, the two curved portions define the arcuate edge. The first curved portion 332 and the second curved portion 333 each have different arc lengths i.e. perimeter lengths. In the illustrated example the second curved portion 333 is longer than the first curved portion. The intermediate flap 313 also comprises a curved edge 334. The arcuate edges 330, 331 and the curved edge 334 define a free edge of the first closure flap 310. The arcuate edges 330, 331 and the curved edge are free edges.

Each side flap 311, 312 comprises a distal panel 340 and a proximal panel 342. The proximal panel 342 of each side flap is proximal to the intermediate flap 313. The distal panel 340 is distal to the intermediate panel 313. The first closure flap 310 comprises two oblique fold features 440, 441. Each side flap comprises an oblique fold feature. The oblique fold feature 440, 441 separates the proximal panel 342 and the distal panel 340. Each side flap 311, 312 can be folded along the oblique fold feature 440, 441. In use, each side flap 311, 312 folds about the side fold feature 430, 431.

The first transverse fold feature 400 comprises a curved shape. The first transverse fold comprises an arc. The first transverse fold feature 400 comprises a concave curve. Concave in this context meaning curved toward the base 110 i.e. lower edge 210 of the wall. The lower edge 210 of the wall is an arcuate shape. The lower edge 210 comprises a convex curve i.e. curved toward the top 120. The lower edge 210 is used to form the base 110 or alternatively a separate part e.g. a disc of material is attached to the lower edge 210 as part of forming the cup.

The cup 100 comprises a third transverse fold feature 404. The third transverse fold feature 404 is disposed on the second closure flap 320. The second transverse fold feature 404 is located adjacent the second transverse fold feature 402. The second transverse fold feature 402 and the third transverse fold feature 404 are curved. The two transverse fold features 402, 404 comprise opposing curves. In the illustrated configuration the second transverse fold feature 402 comprises a concave curve. The third transverse fold feature 404 comprises a convex curve.

As shown in FIG. 1 and FIG. 2, the first closure flap 310 comprises a locking opening 600. The locking opening 600 may be a semi-circular shape. The locking opening 600 may comprise another suitable shape such as for example a crescent shape. The locking opening 600 is a cut out within the first closure flap 310. The second closure flap 320 comprises a locking tab 602. The locking tab 602 extends outwardly from the free edge 334 of the second closure flap 320. The free edge 334 is preferably a straight edge but may include a curvature within it when the cup 100 is formed by rolling the wall 200.

Figure 14:
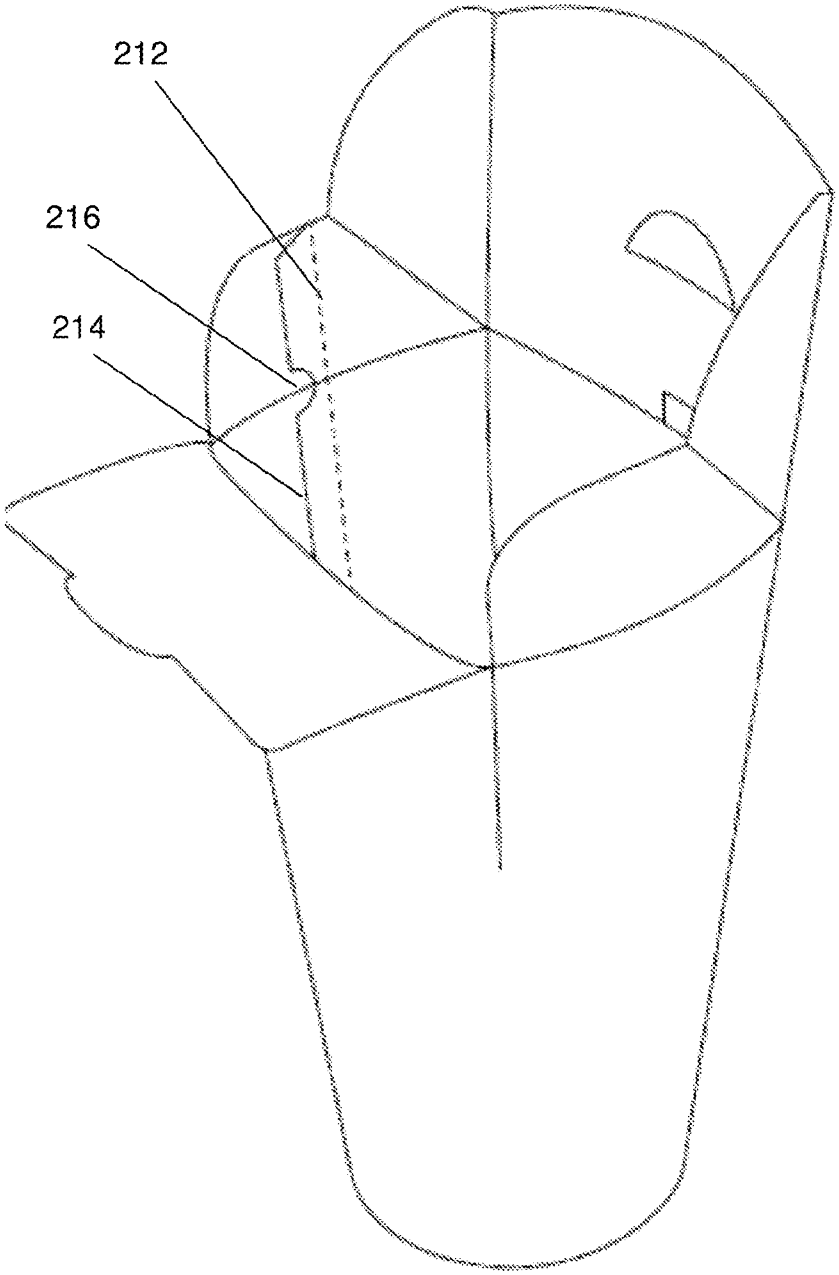
FIG. 14 illustrates the longitudinal edges being overlapping and attached to each other with a cut out in one longitudinal edge.

The wall 200 comprises a first longitudinal edge 212 and a second longitudinal edge 214. The second longitudinal edge 214 may comprise a C shaped cut out 216. The C shaped cut out 216 is positioned at a side fold feature when the first longitudinal edge 212 and second longitudinal edge 214 are overlapped to form the cylinder or prism, as shown in FIG. 14. The C shaped cut out 216 helps to reduce stiffness for folding thereby allowing both side flaps 311, 312 to be folded with a similar force applied by a user. This makes folding the side flaps and folding the first closure flap 310 more intuitive and easier. The C shaped cut out may be an optional feature.

The wall further comprises one or more vertical fold features 450 formed on and/or within the wall 200. As shown in at least FIG. 1 and FIG. 2, the wall 200 comprises four vertical fold features 450. The vertical fold features extend a partial distance along the wall. The vertical fold features 450 extend longitudinally along the wall 200, i.e. parallel to a longitudinal axis of the wall 200. Two vertical fold features align with longitudinal fold features 420, 421. The other two vertical fold features extend away from the second closure flap 320 and align with the vertical edges 321 and 322 of the second closure flap 320. The four vertical fold features 450 help to make rolling the wall 200 easier. The wall can be folded or rolled to attach the two longitudinal edges 214, 212 together. The vertical fold features 450 help to make rolling the wall 200 easier. The vertical fold features 450 may be lines or weakened areas.

Figure 12:
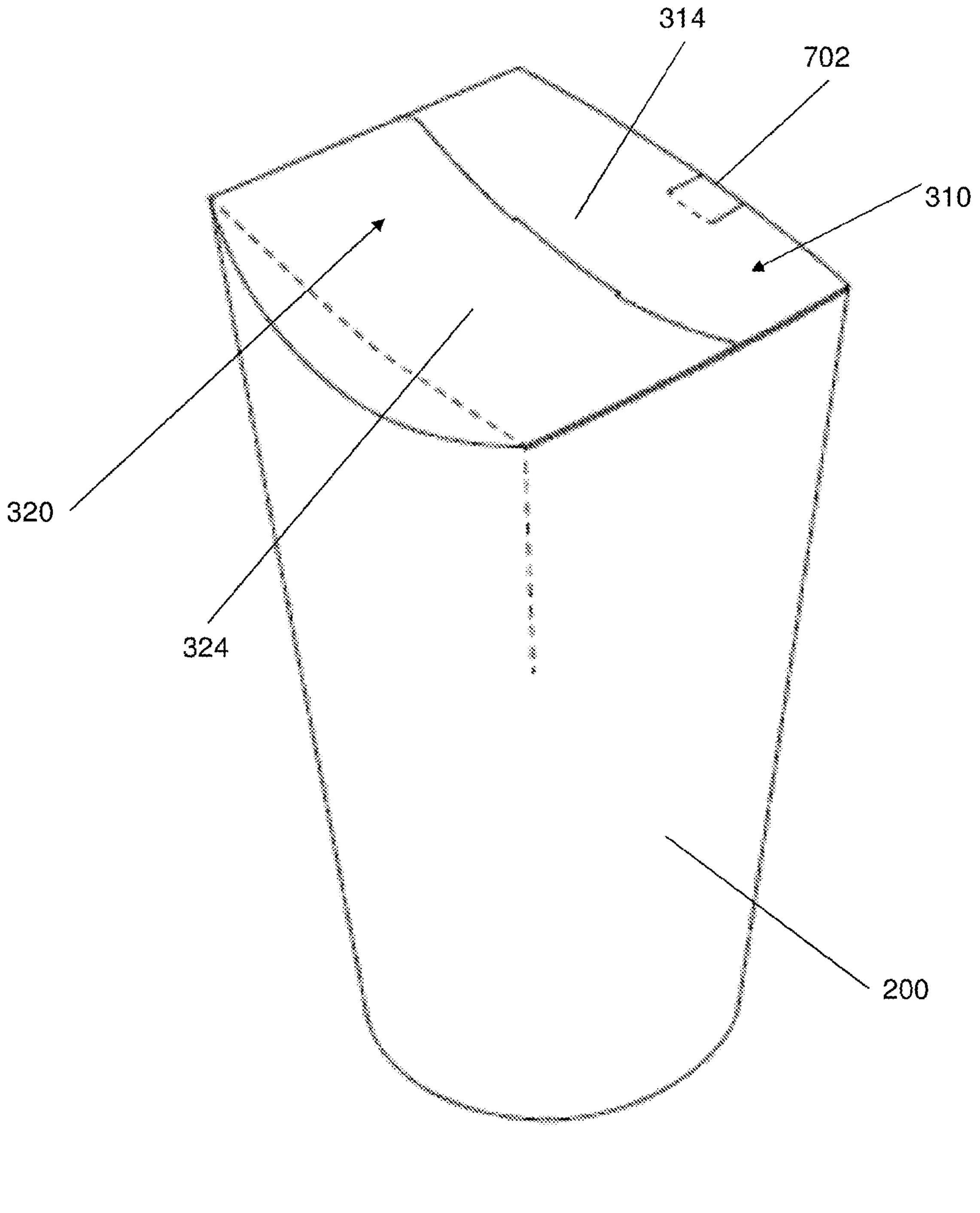
FIG. 12 illustrates the outlet opening and cover in a closed position covering the outlet opening.
Figure 13:
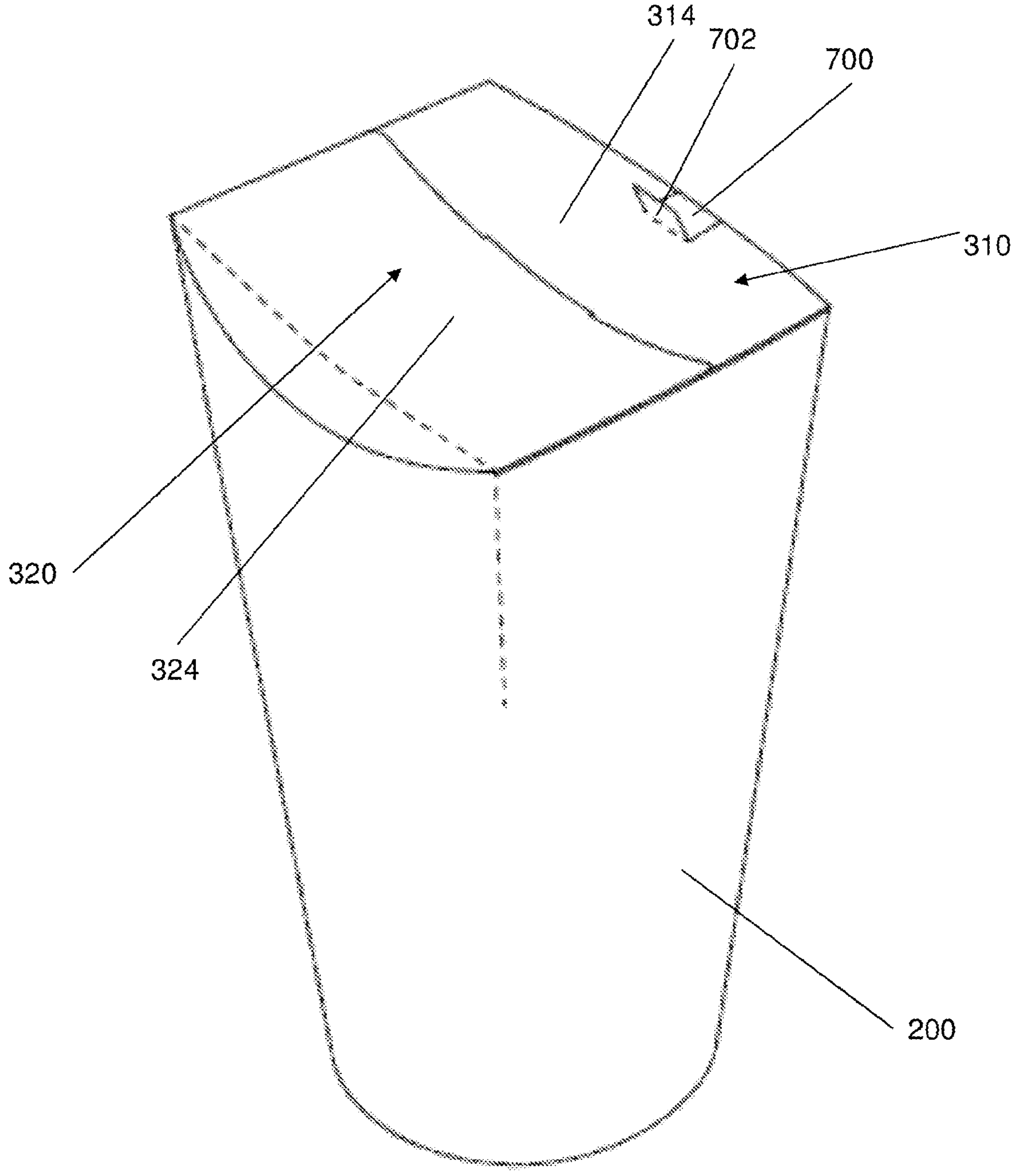
FIG. 13 illustrates the cover in an open position such that the outlet opening is accessible and open.

The cup 100 further comprises an outlet opening 700 and a foldable cover 702, as shown in FIG. 12 and FIG. 13. The foldable cover 702 is moveable between a closed and open position The outlet opening 700 being exposed when the cover 702 is an open position. The outlet opening 700 is accessible by a user when the cover 702 is in the open position such that contents of the cup can exit out of the opening 700. The outlet opening 700 is covered by the cover 702 when the cover is in the closed position.

The cup 100 is formed using an automated process. The cup 100 may be formed by a cup forming machine. The blank 500 can be used as a pattern to stamp or cut out the blanks shape. The cup 100 is formed by rolling the wall and attaching the longitudinal edges 212, 214 to each other. The longitudinal edges 212, 214 may be adhered together or welded together. The vertical fold features 450 can help in rolling the wall to create the frustoconical shape of the cup 100. The blank 500 can be used to cut out multiple patterns to form multiple cups 100.

Figure 4:
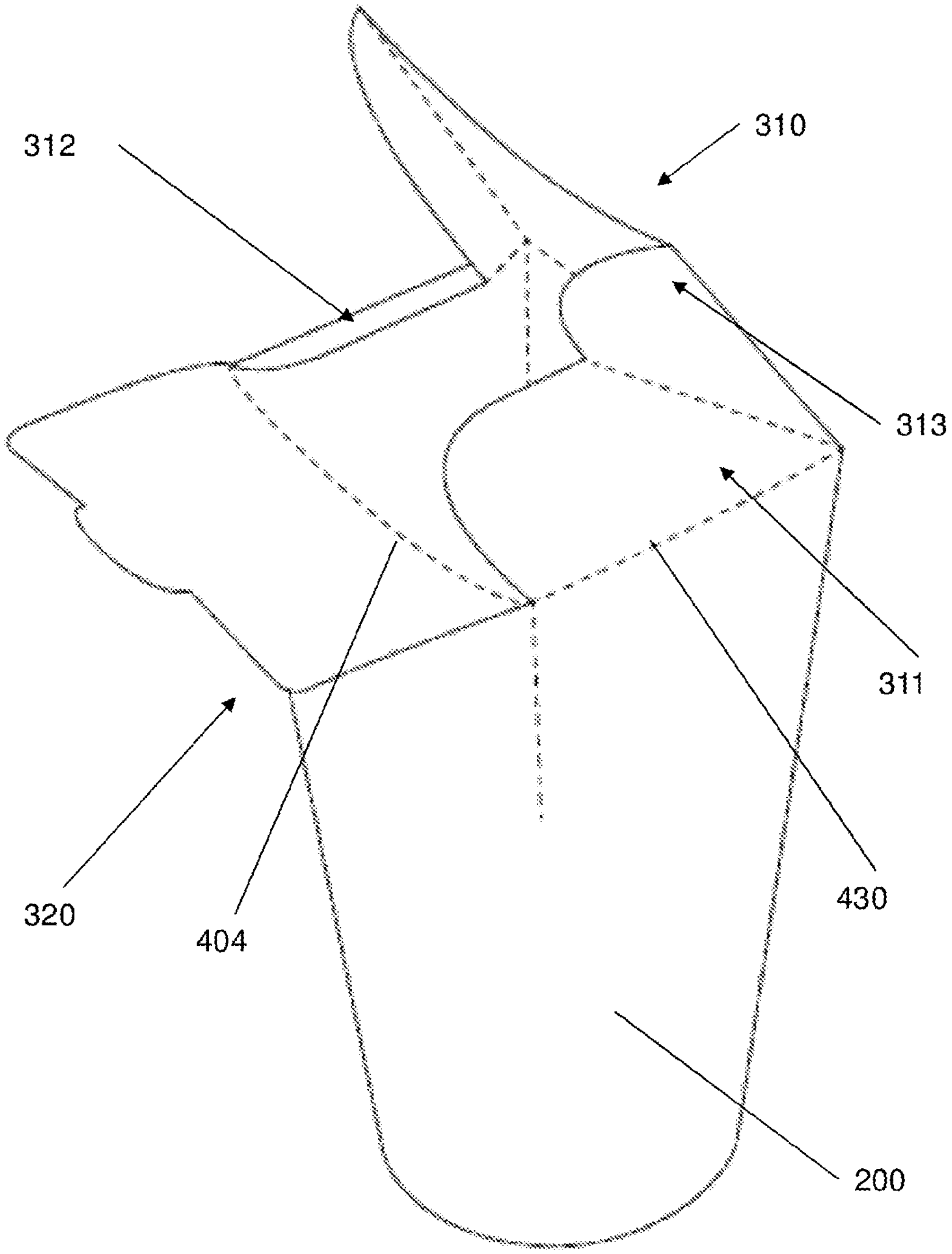
FIG. 4 illustrates a first fold formed within the first closure flap.
Figure 5:
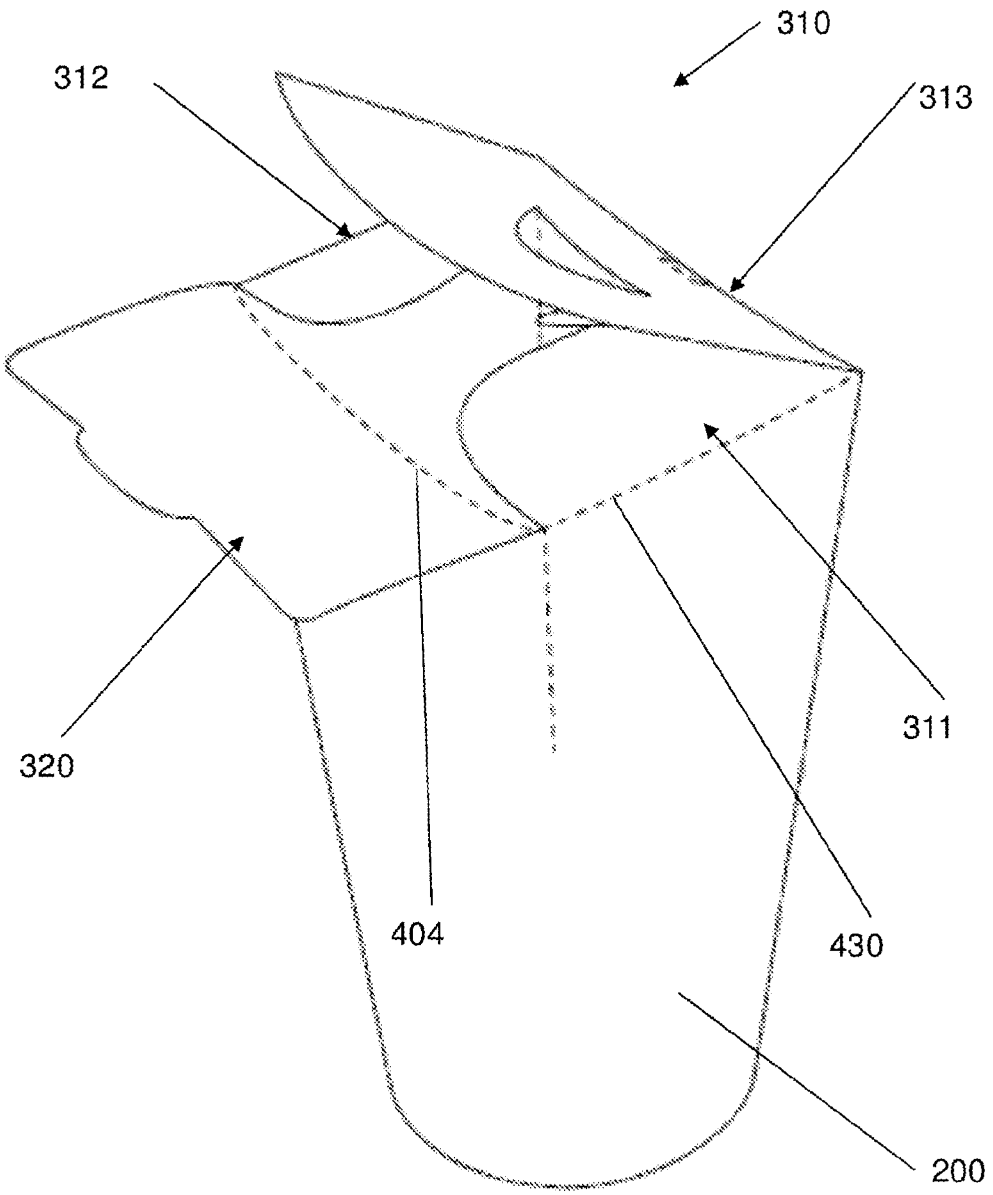
FIG. 5 illustrates a second fold formed within the second closure flap.
Figure 6:
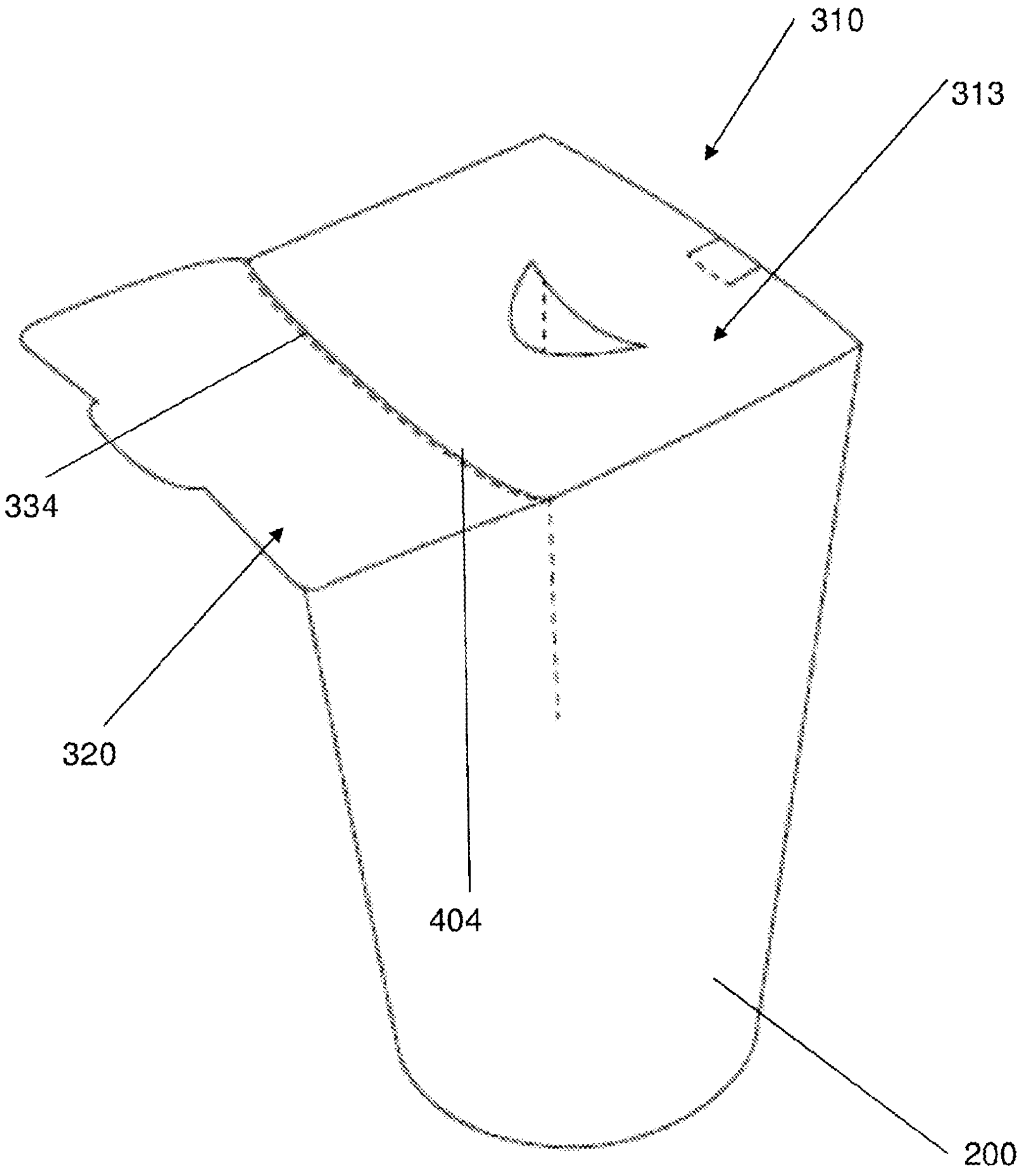
FIG. 6 illustrates the first closure flap in a closed position.
Figure 7:
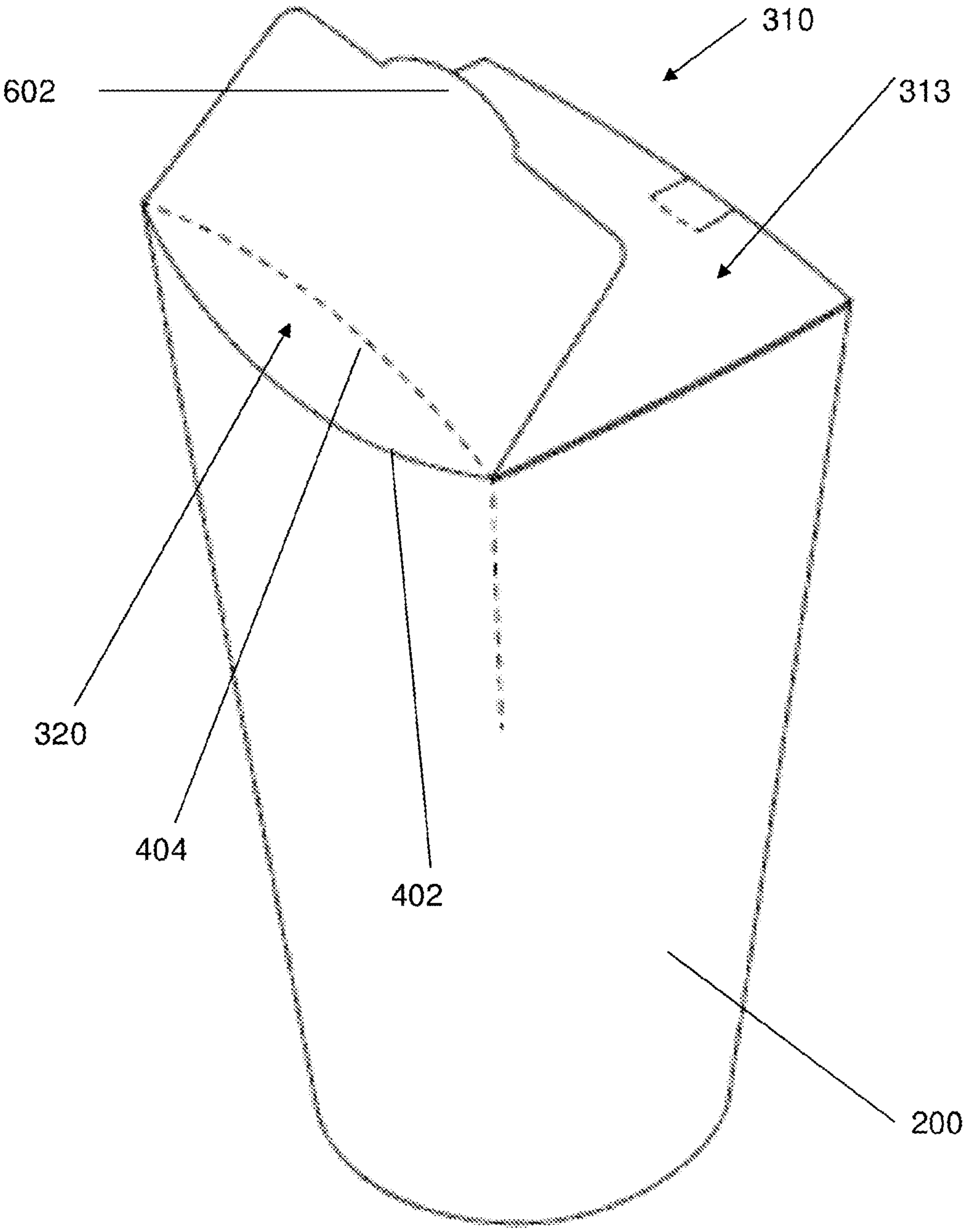
FIG. 7 illustrates the second closure flap being folded to a closed position.
Figure 9:
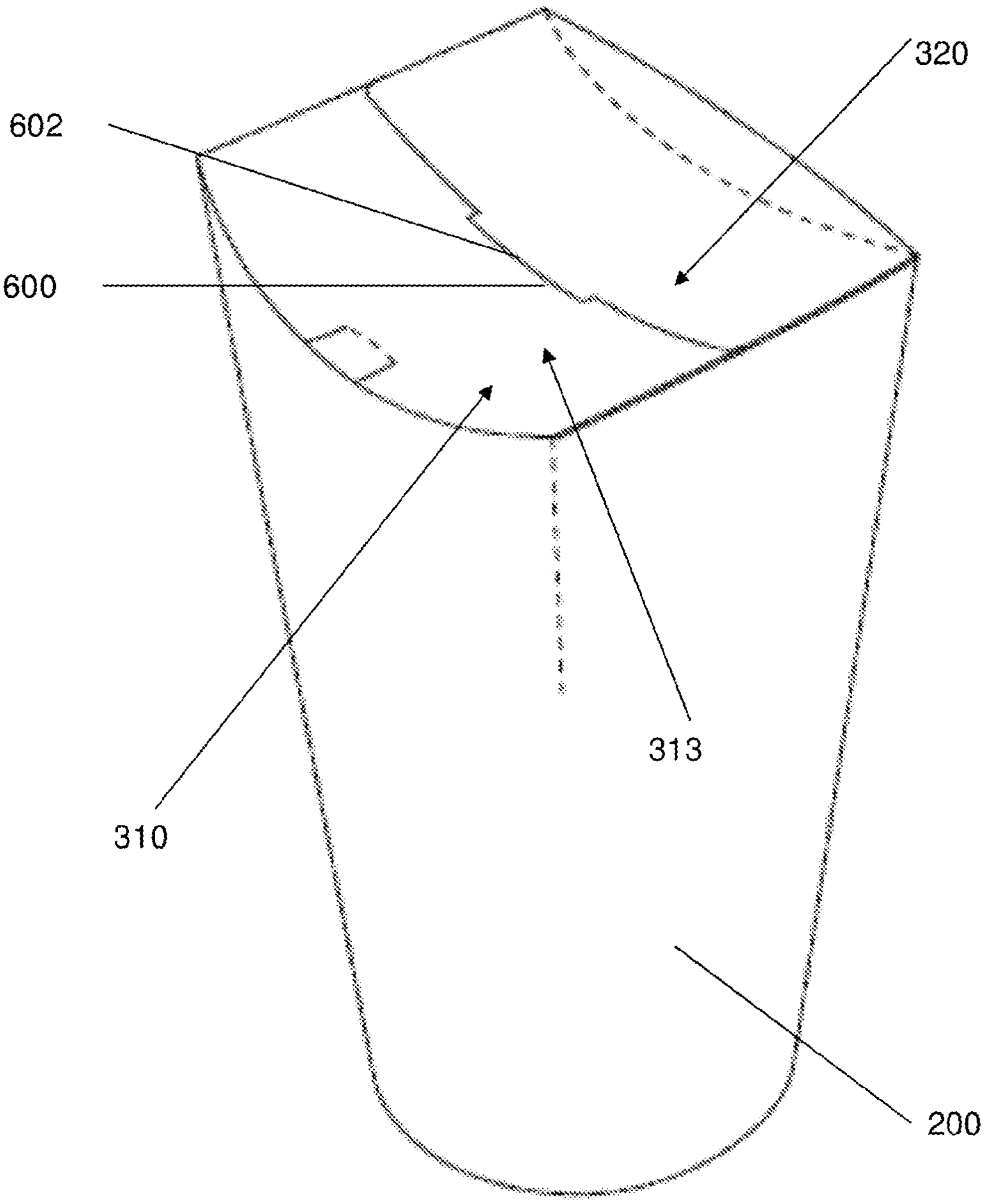
FIG. 9 illustrates the locking tab engaged in a locking opening to lock the lid in a closed position.

The use of the cup 100 will now be described. The lid 300 is formed by folding the first closure flap 310 and the second closure flap 320. The first closure flap 310 is folded twice to move the first closure flap 310 to a closed position. The second closure flap 320 is folded once to move the second closure flap 320 to a closed position. FIGS. 4 to 6 illustrate the process of folding the first closure flap 310 to a closed position. The lid 300 is formed by a three fold arrangement. The first closure flap 310 is folded twice and the second closure flap 320 is folded once to close the lid. FIG. 4 illustrates a first fold of the first closure flap 310. The first closure flap is folded along the oblique fold features 440, 441. FIG. 5 shows the second fold of the first closure flap 310, where the first closure flap is folded about the first transverse fold feature 400. FIG. 6 illustrates the folded position of the first closure flap 310. FIG. 7 shows the second closure flap 320 is folded about the second transverse fold feature 402. FIG. 9 shows the lid in the closed position.

Referring to FIG. 4, the first closure flap is folded along the side fold features 430, 431, and the transverse fold feature 400. In particular, the side flaps 311, 312 are folded inward i.e. toward each other along the side fold features 430, 431. The intermediate flap 313 is folded inward along the transverse fold feature.

The first closure flap 310 is folded about the oblique fold features 440, 441 as shown in FIG. 4 and FIG. 5. Each side flap 311, 312 is folded about the oblique fold features 440, 441 to create the second fold of the first closure flap 310. The folding about oblique fold features 440, 441 creates a pair of opposing arcuate lips. The opposing inward pointing arcuate lips are defined by the arcuate edge 330, 331 of each side flap 311, 312. The intermediate flap 313 is folded along the oblique fold features 440, 441 and the transverse fold feature 400. The arcuate edge 330, 331 of each side flap and the curved edge 334 of the intermediate flap form a folded flap. The edges of the side flaps and the intermediate flap forms three faces and three lips create sealing structures to prevent the contents of the cup from spilling out when the cup is tipped or tilted to a drinking orientation or when tipped toward the intermediate flap. The proximal and distal panels of each side flap 311, 312 and the intermediate flap 313 have a distance such that when folded into a closed position, the flaps overlap each other.

FIG. 6 shows the fully closed orientation of the first closure flap 310 (i.e. a closed position of the side flaps 311, 312 and the intermediate flap 313). As shown in FIG. 5, the side flaps 311, 312 are folded inward and the arcuate edges 330, 331 are folded toward each other. The intermediate flap 313 rests on top of the folded side flaps 311, 312. The first curved portion 332 of each side flap 311, 312 are longer than the second curved portion 333. The first curved portion 332 of each side flap 311, 312 extend closer to each other when in the folded position, as compared to the second curved portions 333 of each side flap 311, 312. The two curved portions 332, 333 create curved sealing surfaces to prevent contents of the cup spilling out.

The curvature of curved edge 334 of the intermediate flap 313 corresponds to the curvature of the second transverse fold feature 402 as shown in FIGS. 1, 5 and 6. As shown in FIG. 6, the intermediate flap 313 has a length that extends across the top such that the curved edge 334 of the intermediate flap 313 rests in contact with the second transverse fold feature 402. FIG. 6 shows the intermediate flap 313 extending the top 120 and extending from one side to the other side of the cup to shut off the cup.

FIG. 6 shows the matching curvature of the second transverse fold feature 402 and the curved edge 334 of the intermediate flap 313. The matching curvature is advantageous because this improves sealing of the cup and helps to prevent or at least reduces the chances of the contents of the cup from leaking out.

Figure 8:
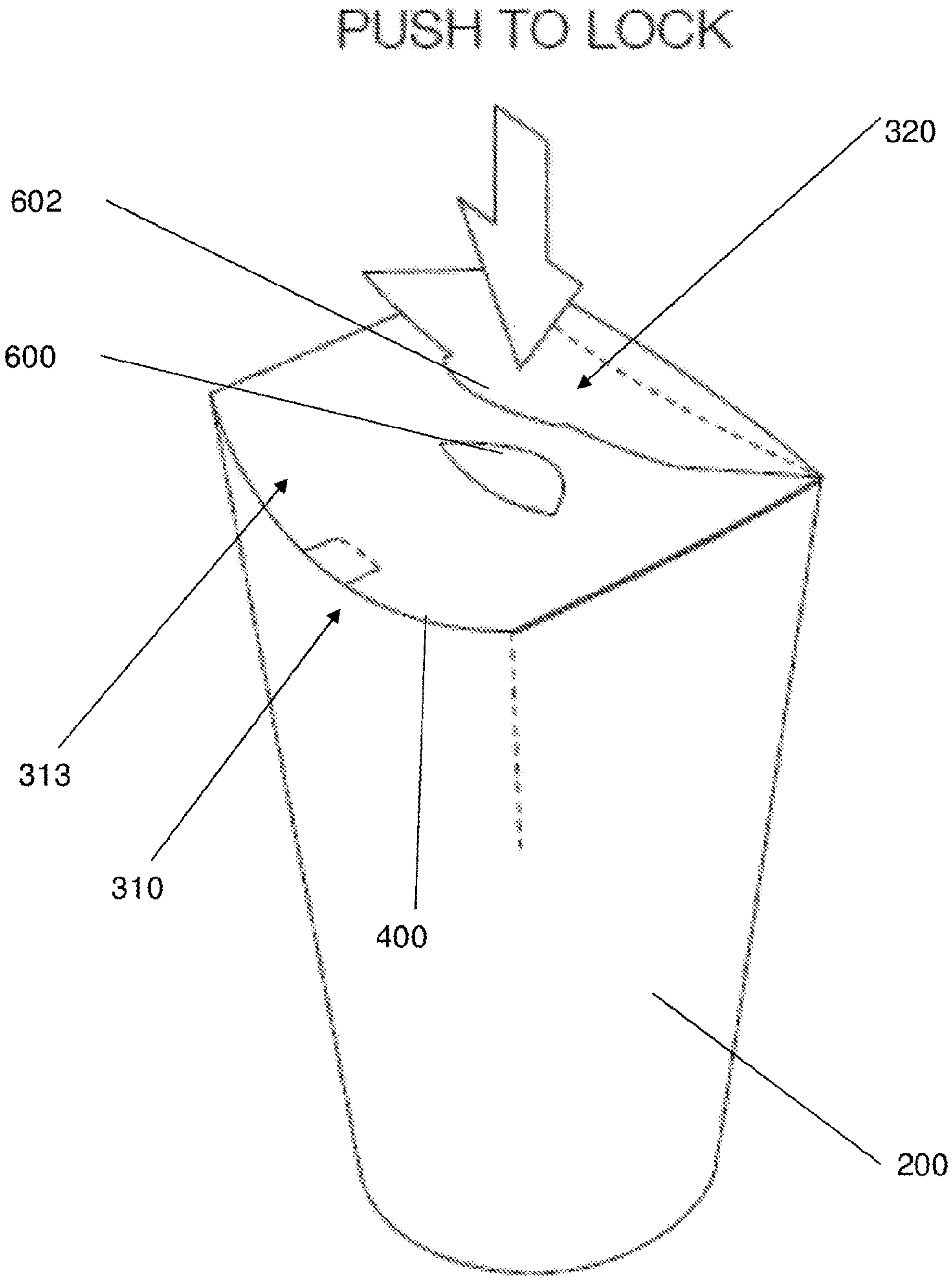
FIG. 8 illustrates a force being applied to an upper surface of the second closure flap to engage the locking tab of the second closure flap into a locking opening.

The second closure flap 320 is folded about the second transverse fold feature 402, as shown in FIG. 7. The second closure flap 320 rests on top of the intermediate flap 313, as shown in FIG. 9. The locking tab 602 is pushed into the locking opening 600, as shown in FIG. 8. Further a downward force is applied by the user to insert the locking tab 602 into the locking opening 600. The locking tab received into the locking opening locks the second closure flap 320 to the first closure flap 310, thereby locking the lid into a closed position.

The second fold feature 402 being concave shaped allows for easy folding of the second closure flap 320 to a closed position and allows a user to easily engage the locking tab 602 into the locking opening 600. The second fold feature 402 being concave in shape allows a user to fold the second closure flap 320 without upsetting the folded first closure flap 310 and reduces the force required to fold the second closure flap 320 and lock the flap 320.

Figure 10:
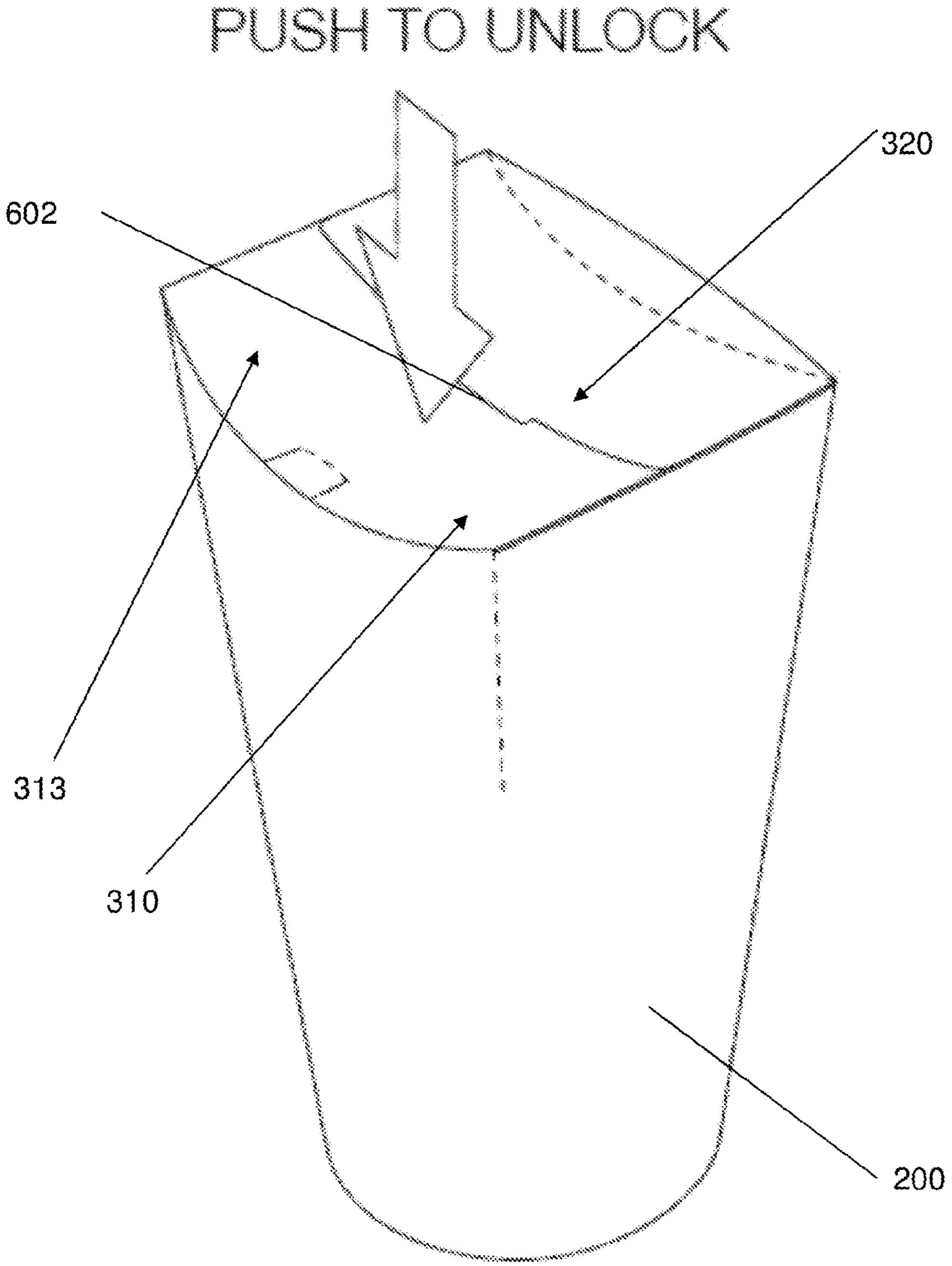
FIG. 10 illustrates a force applied to an upper surface of the second closure flap to unlock the locking tab
Figure 11:
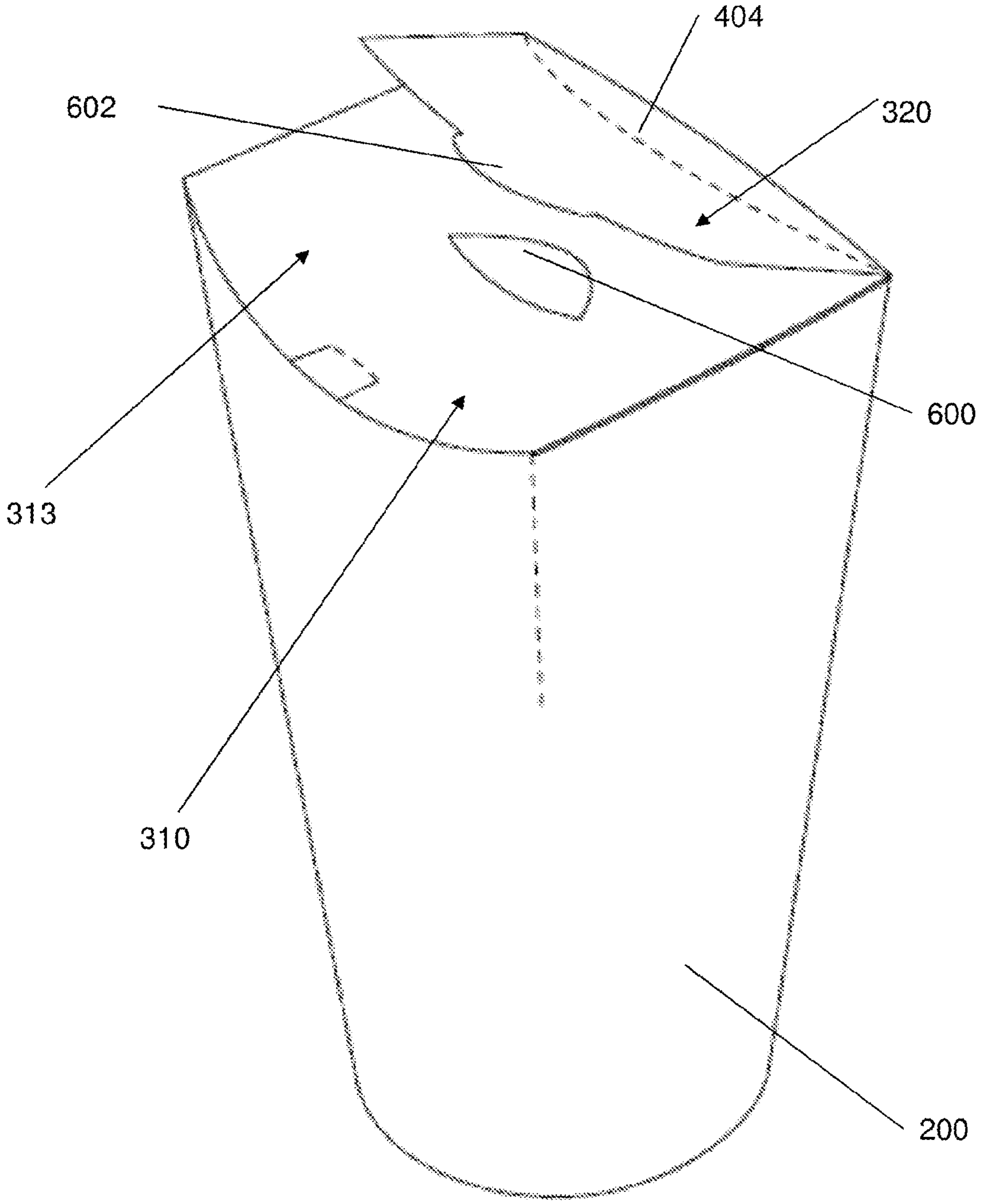
FIG. 11 illustrates the locking tab being disengaged from the locking opening.

The locking tab 602 can be unlocked from the locking opening 600 by applying a force on an upper surface of the lid 300, as shown in FIG. 10. More specifically to open the lid 300, the user can apply a force (i.e. push down) on the second closure flap 320 when in the folded arrangement as denoted by the arrow shown in FIG. 10. The locking tab 602 is removed from the locking opening 600, and the second closure flap 320 moves upward as shown in FIG. 11. The second closure flap 320 is biased upward due to the concave shape of the second transverse fold feature 402. This concave shape of the fold feature 402 provides additional tension to form a better seal.

Preferably audible feedback or tactile feedback is provided when the locking tab 602 is engaged into the locking opening 600. Further audible feedback or tactile feedback is provided when the locking tab 602 is disengaged from the locking opening 600. The audible feedback comprises an audible click which is generated due to the curved upper surface of the first closure flap 310 and a curved upper surface of the second closure flap 320. The audible click is also due to the second closure flap 320 being biased upward i.e. the second closure flap expands and retracts to create the clicking sound. The closure flap 320 expands i.e. moves upward due to it being biased upward.

The locking opening 600 is shown in this example as a cut out aperture. However, the opening 600 may take other forms including a slit, cut, slot or any other receiving structure that can be cut or pressed into the flap so as to receive the locking tab 602.

Figure 15:
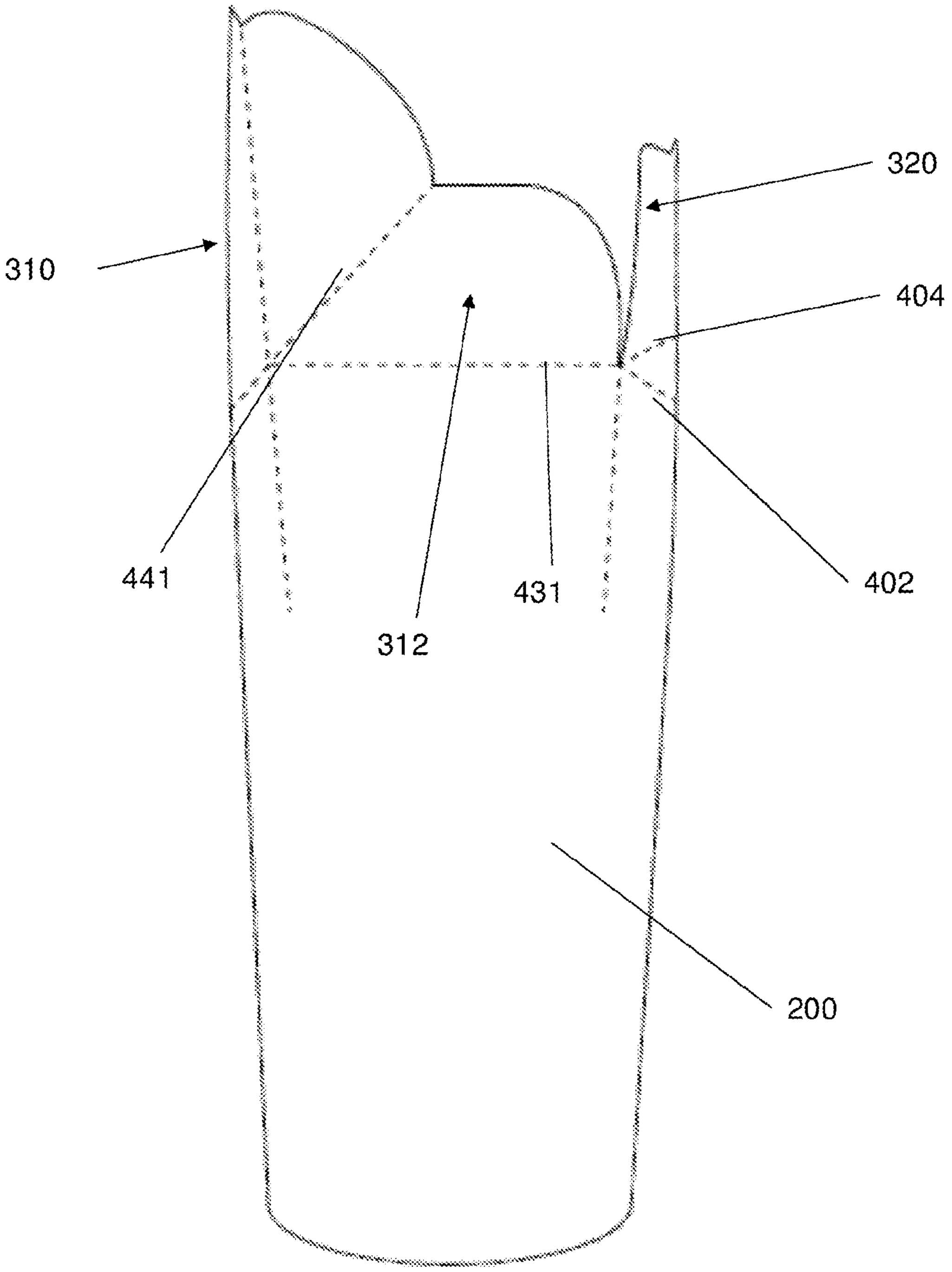
FIG. 15 and FIG. 16 illustrate side views of the second closure flap moving to a folded back orientation.
Figure 16:
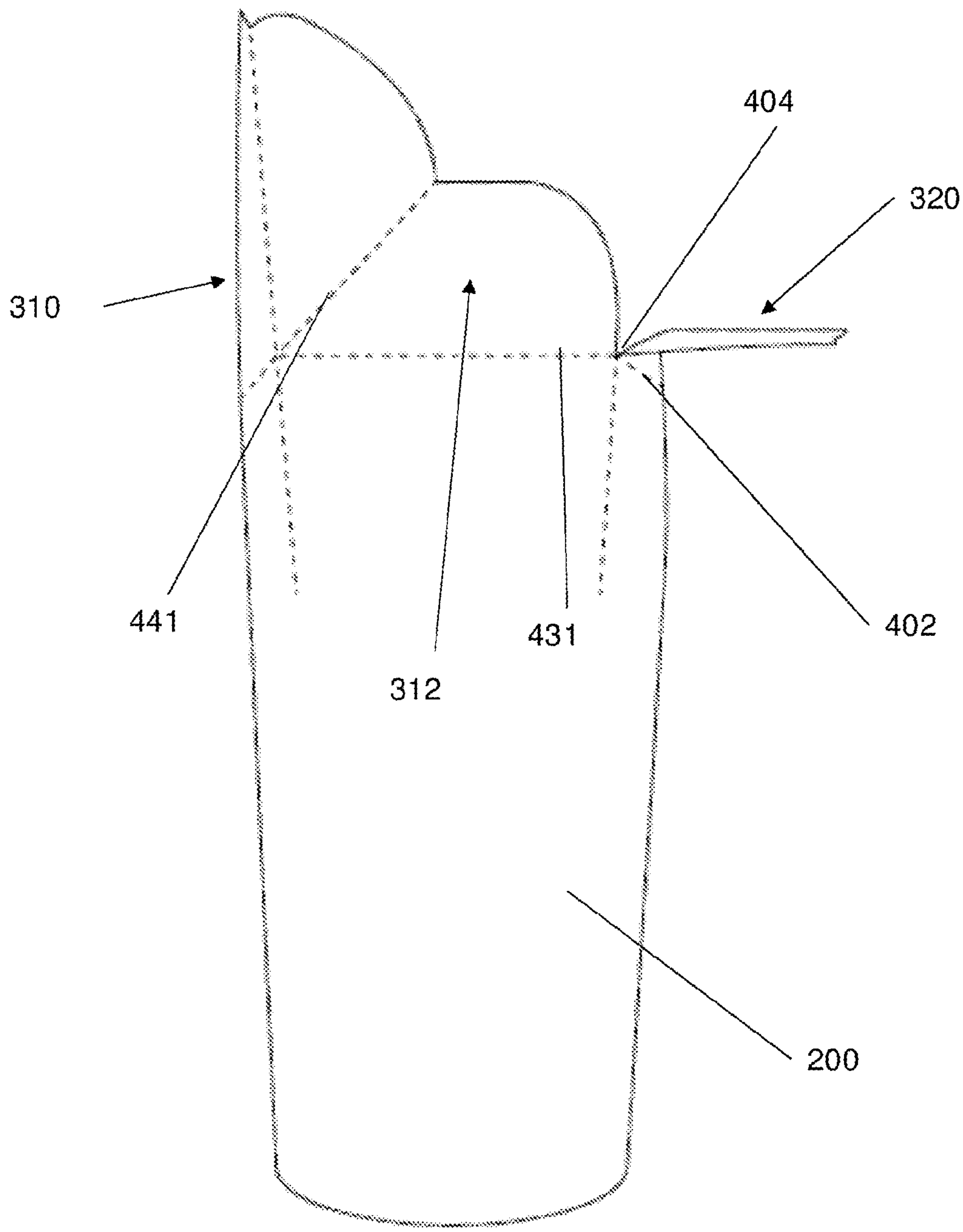

The second closure flap 320 can be folded back. The second closure flap 320 is configured to be folded between 0 degrees and 180 degrees. The second closure flap 320 is in a fully open position when the second closure flap is at 0 degrees, as shown in FIG. 2 and FIG. 16. The second closure flap 320 is in a closed position when the second closure flap is at 180 degrees as shown in FIG. 9 and FIG. 10. The second closure flap 320 is perpendicular to the first closure flap 310 when at 0 degrees, as shown in FIG. 16. The second closure flap 320 can also be positioned at 90 degrees as shown in FIG. 15.

Figure 3:
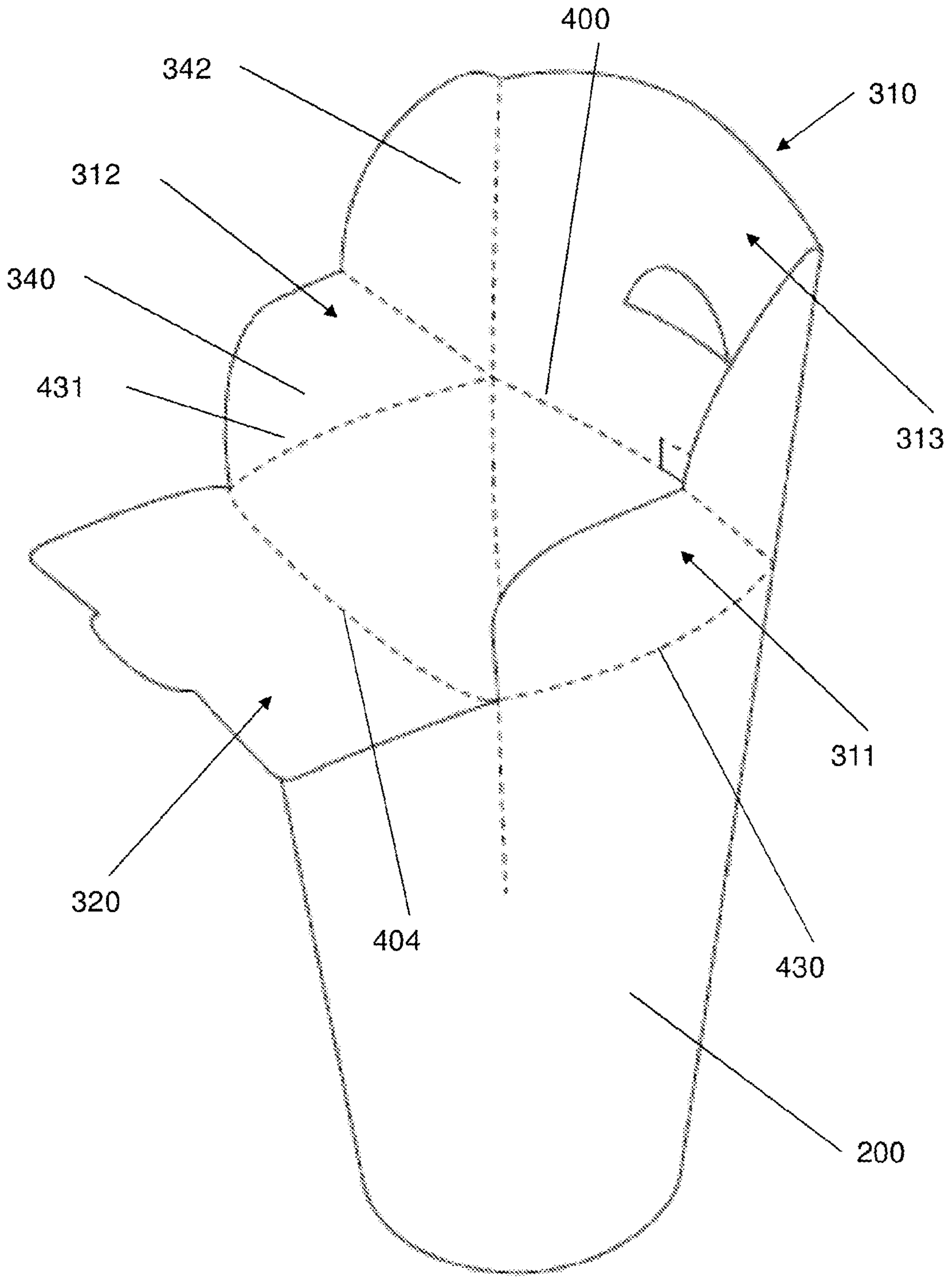
FIG. 3 illustrates the cup of FIG. 1 with the second closure flap in folded back position.

The third transverse fold feature 404 is disposed on the second closure flap 320. The third transverse fold feature 404 is positioned adjacent the second transverse fold feature 402. The second closure flap 320 is foldable about the third transverse fold feature to allow the second closure flap to move between 0 degrees and 180 degrees and any position between 0 degrees and 180 degrees is relative to a horizontal. As shown in FIG. 3 and FIG. 16 when the second closure flap 320 is in fully folded back i.e. at 0 degrees, a user can view inside the cup and determine a fill level of the cup. The folded back second closure flap 320 allows a user to view the fill level as the cup is being filled e.g. by a drinks dispenser. Additionally, the second closure flap 320 may also be folded back by a user so as to open the cup whilst forming a lip for a user to drink or access the contents directly from the cup.

Figure 17:
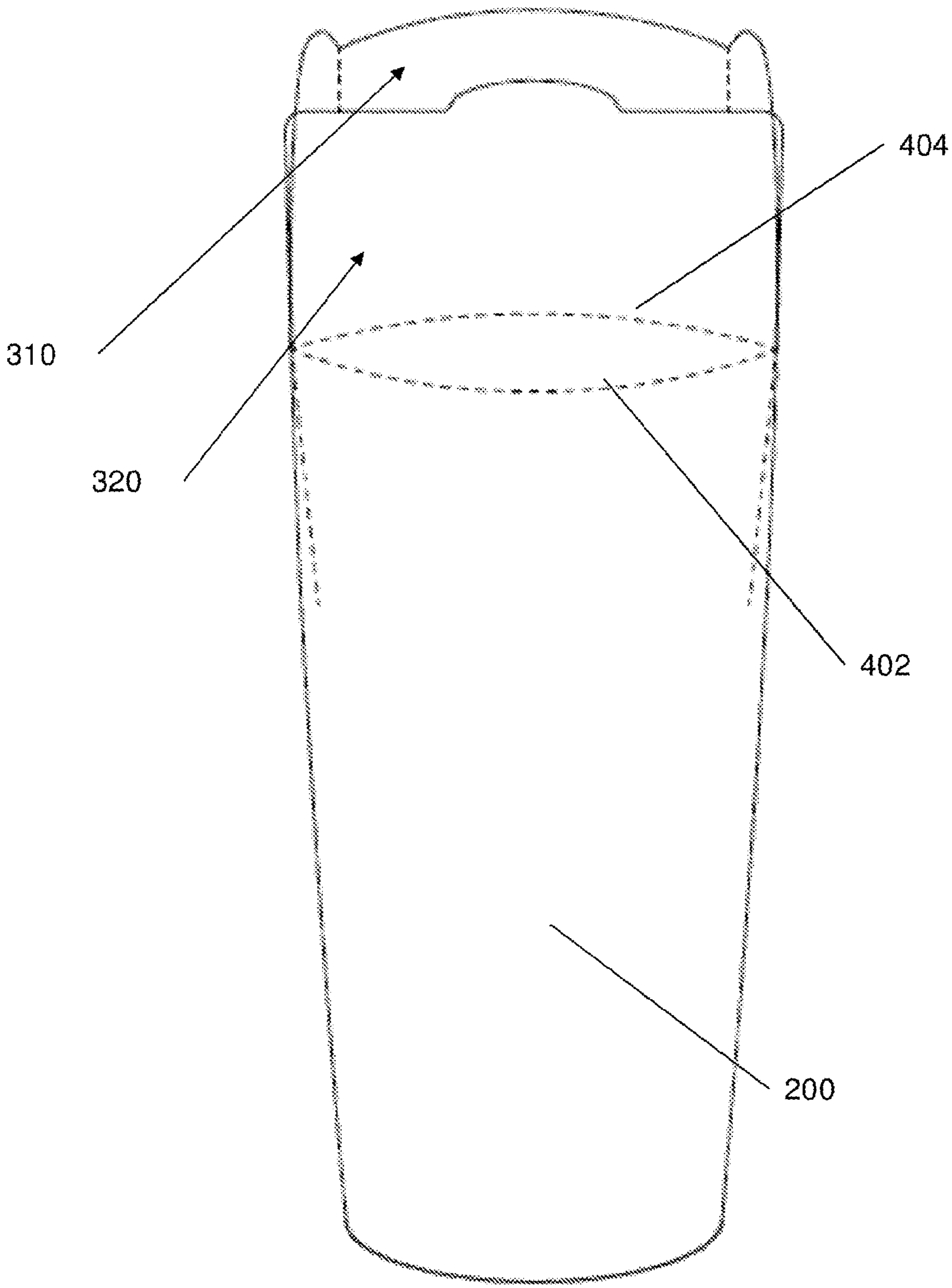
FIG. 17 and FIG. 18 illustrate front views of the second closure flap moving to a folded back orientation.
Figure 18:
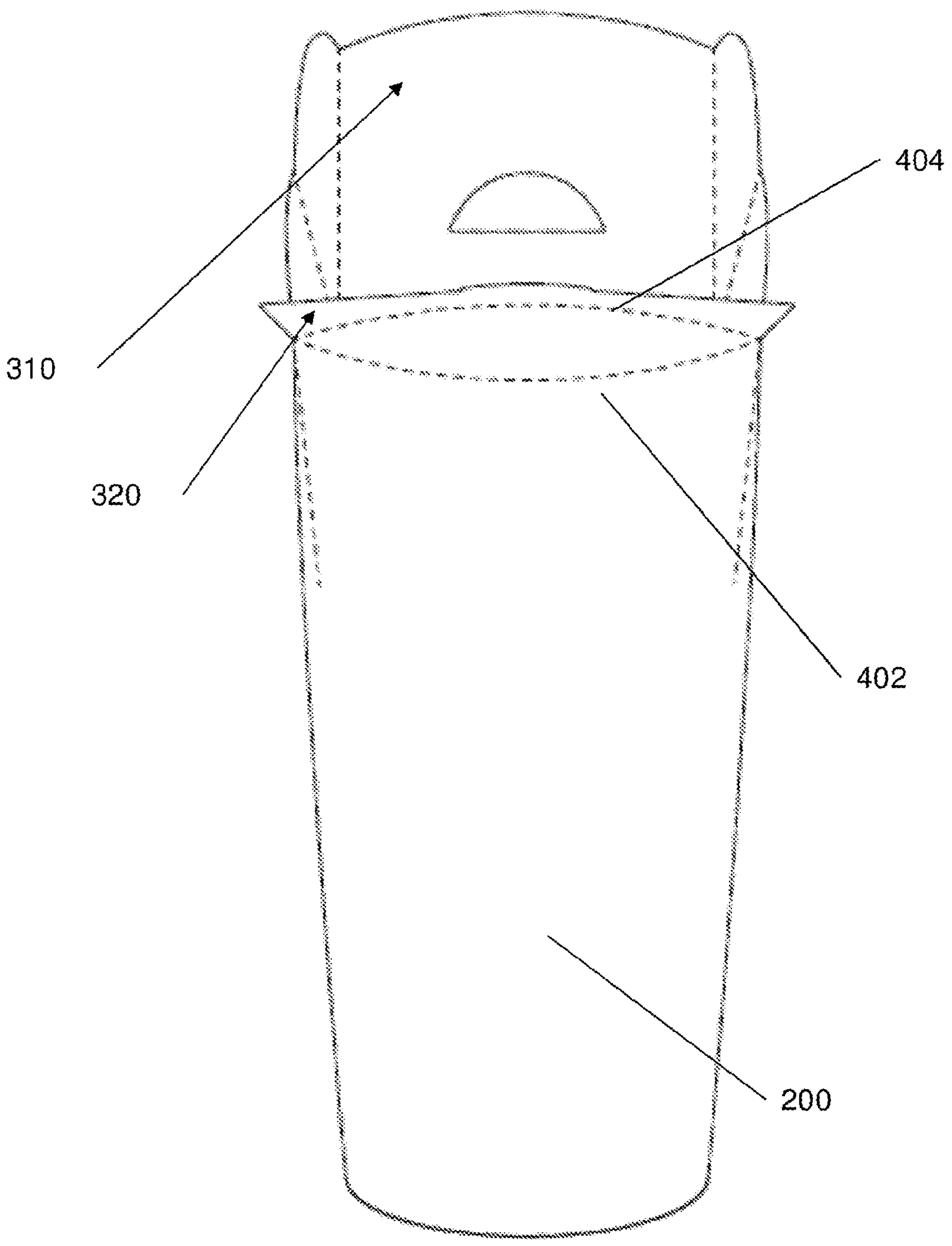

FIGS. 17 and 18 show a front view of the cup. FIG. 17 shows the second closure flap 320 at a 90 degrees position relative to a horizontal. FIG. 17 shows the second transverse fold feature 402 and the third transverse fold feature 404. The second transverse fold feature 402 and the third transverse fold feature 404 are curved. The two fold features are curved in opposed directions. FIG. 17 more clearly illustrates the convex curve of the third transverse fold feature 404 and the concave curvature of the second transverse fold feature 402. As shown in FIG. 18, which is a front view of FIG. 16, the second closure flap 320 is folded about the third transverse fold feature to a 0 degrees position i.e. the closure is folded back to expose the hollow space 202.

The second transverse fold feature 402 and the third transverse fold feature 404 comprise opposing curvatures. The third transverse fold feature 404 is a convex shaped curvature and the second transverse fold feature 402 is a concave fold feature 402. The convex shaped third transverse fold feature 404 allows the second closure flap 320 to be folded back without upsetting or disrupting the rest of the structure e.g. the folded first flap 310. FIG. 16 illustrates the folded back position of the second flap 320. FIGS. 4 to 6 illustrate the second closure flap 320 in the folded back position while the first closure flap 310 is folded without any interference.

FIGS. 12 and 13 illustrate the outlet opening 700 and the foldable cover 702. FIG. 12 shows the cover 702 in a closed position and the outlet opening 700 being covered. FIG. 13 illustrates the cover 702 in an open position and the outlet opening 700 being accessible by a user. The outlet opening 700 and cover 702 remain closed due to the curvature of the first closure flap 310 and second closure flap 320.

The cover 702 has to be manually opened thereby reducing the chances of accidental spillage through the outlet opening 700. The cover 702 in combination with the arcuate lips formed by the folded side flaps improves sealing of the cup. The outlet opening 700 is sized to allow a straw or stirrer to be placed into the cup. The opening 700 is sufficiently sized to allow a user to drink through it.

FIG. 14 illustrates the longitudinal edges being overlapped to form a cylinder or prism shape to define the container. The second longitudinal edge 214 comprises a cut out 216. The cut out 216 is a C shaped cut out. The C shaped cut-out 216 is positioned at a side fold feature when the first longitudinal edge and second longitudinal edge are overlapped to form the cylinder or prism, the C shaped cut out improving foldability of each side flap. The C shaped cut out reduces the stiffness of the side flaps, therefore making folding of the side flaps easier. The side flaps 311, 312 can be folded with a similar force applied by the end user, making forming the lid easier.

FIGS. 12 and 13 illustrate a closed configuration of the lid 300. The lid 300 comprises a curved upper surface. The upper surface of the lid 300 is curved inward i.e. a concave curvature. As shown in FIGS. 12 and 13, the first closure flap 310 and the second closure flap 320 each comprise a curved upper surface. The upper surface 314 of the first closure flap 310 and an upper surface 324 of second closure flap are curved in the same direction. The first closure flap 310 and the second closure flap 320 comprise a concave curvature i.e. the flaps are curved inward. More specifically the intermediate flap 313 of the first closure flap and the second closure flap 320 comprise a concave curvature, as shown in FIG. 12 and FIG. 13.

The cup 100 comprises straight side edges. Each side fold feature 430, 431 are defined along a straight edge of the wall 200. The upper surface 314 of the first closure flap and the upper surface of the second closure flap comprise a concave curvature. The straight edges at each side of the cup allows for easier folding as the tension on the side flaps is in one direction. The concave curvature of the first closure flap 310 and the second closure flap 320, along with the straight edges creates a tension i.e. a biasing force inward to make folding the closure flaps easier. Further the concave curvature of the upper surfaces allows for a user's nose to be received within the space formed by the curved surface to make drinking easier from the cup 100.

The cup 100 described herein provides several advantages as described herein. The shape and structure of the cup 100 allows for easier closure of the lid. The cup comprises a first and second closure flap that define the lid. The closure flaps are integrated with the wall of the cup therefore making an integrated lid. The first closure flap is folded twice and the second closure flap is folded once to create a closed lid as shown in FIG. 12. The three fold arrangement allows for an easy closure method. The first closure flap comprises two side flaps with arcuate edges i.e. arcuate free edges. The side flaps are folded inwards and the arcuate edges create multiple, overlapping sealing edges. The side flaps and intermediate flaps being positioned on top of each other, create multiple sealing faces thereby reducing the chances of leakage from the cup. The second closure flap can be folded right back to allow easier viewing of the contents of the cup. The cup comprises two fold features with two opposing curves. This allows the second closure flap to be folded along 180 degrees therefore allowing the second closure flap to close and completely open.

The term fold feature or folding feature as describe herein define fold structures that allow a flap to fold about the fold feature. The fold features may be fold lines. Alternatively, the fold features may be weakened areas of the flap or wall or other structure of the cup. For example, the fold features may be half-cut curves and/or lines, perforated curves and/or lines.

The description of any of these alternative embodiments is considered exemplary. Any of the alternative embodiments and features in the alternative embodiments can be used in combination with each other or with the embodiments described with respect to the figures.

The foregoing describes only a preferred embodiment of the present invention and modifications, obvious to those skilled in the art, can be made thereto without departing from the scope of the present invention. While the invention has been described with reference to a number of preferred embodiments it should be appreciated that the invention can be embodied in many other forms.

The invention claimed is:

1. A cup manufactured, at least in part, from a paper based material, the cup comprising:
- a base;
- a wall extending from the base to enclose the base, the wall including:
  - a fold line that extends across the wall and defines a lid border opposite the base, and
  - a first longitudinal edge and a second longitudinal edge, the wall being formed by attaching the first longitudinal edge and the second longitudinal edge together to create a seam, and at least one of the first longitudinal edge or the second longitudinal edge including at least one cut at the fold line;
- a first closure flap extending beyond the fold line, the first closure flap being attached to the wall via the fold line;
- a second closure flap extending beyond the fold line, the second closure flap being attached to the wall via the fold line, the second closure flap having lateral sides disconnected from the first closure flap; and
- an outlet for accessing an inside of the cup, the outlet being located on at least one of the first closure flap and the second closure flap above the fold line,
- wherein the at least one cut at the fold line reduces a stiffness for folding at least one of the first closure flap or the second closure flap.

2. The cup according to claim 1, wherein the at least one cut includes at least one cut through the at least one of the first longitudinal edge or the second longitudinal edge.

3. The cup according to claim 1, wherein the at least one cut includes at least one cutout portion at the fold line.

4. The cup according to claim 1, wherein the first longitudinal edge and the second longitudinal edge overlap, such that the second longitudinal edge is on an internal side of the wall.

5. The cup according to claim 4, wherein the second longitudinal edge comprises the at least one cut.

6. The cup according to claim 4, wherein the at least one cut has a length less than a distance by which the first longitudinal edge and the second longitudinal edge overlap.

7. The cup according to claim 4, wherein the second longitudinal edge comprises a flap,
- wherein the flap extends laterally by a distance by which the first longitudinal edge and the second longitudinal edge overlap, and
- wherein an upper edge of the flap is beveled.

8. The cup according to claim 1, wherein the seam is positioned part way along a width of the first closure flap or the second closure flap.

9. The cup according to claim 8, wherein at least one of the first closure flap or the second closure flap is configured to fold inwards about the fold line to a closed position at least partially covering an upper opening of the cup.

10. The cup according to claim 1, wherein the at least one cut is C-shaped or U-shaped.

11. The cup according to claim 1, wherein the at least one cut spans the fold line.

12. The cup according to claim 1, wherein the lid border defines a substantially rectangular opening.

13. The cup according to claim 1, wherein:
- the first closure flap includes a tab, and the second closure flap includes a slit for receiving the tab, or
- the second closure flap includes a tab, and the first closure flap includes a slit for receiving the tab.

14. A blank for forming a cup manufactured, at least in part, from a paper based material, the blank comprising:
- a wall configured, such that when the cup is formed, to extend from a base to enclose the base, the wall including:
  - a fold line that extends across the wall and defines a lid border opposite the base, and
  - a first longitudinal edge and a second longitudinal edge, the wall being formable by attaching the first longitudinal edge and the second longitudinal edge together to create a seam, at least one of the first longitudinal edge or the second longitudinal edge including a at least one cut at the fold line;
- a first closure flap extending beyond the fold line, the first closure flap being attached to the wall via the fold line;

a second closure flap extending beyond the fold line, the second closure flap being attached to the wall via the fold line, and the second closure flap having lateral sides disconnected from the first closure flap; and an outlet for accessing an inside of the cup, the outlet being located on at least one of the first closure flap and the second closure flap above the fold line, wherein the at least one cut at the fold line reduces a stiffness for folding at least one of the first closure flap or the second closure flap.

15. A cup having an integrated lid, the cup comprising:

a base;

a wall extending from the base to enclose the base, the wall defining a top opening opposite the base, the wall including a first longitudinal edge and a second longitudinal edge, the wall being formed by overlapping the first longitudinal edge and the second longitudinal edge to create a seam, and at least one of the first longitudinal edge or the second longitudinal edge including a cutout;

a first closure flap extending beyond the top opening and connected to the wall by a first fold line; and a second closure flap extending beyond the top opening and connected to the wall by a second fold line, wherein the first closure flap and the second closure flap are foldable inwards about the first fold line and the second fold line, respectively, to at least partially cover the top opening.

16. The cup according to claim 15, wherein at least one of the first closure flap or the second closure flap extends at least part way across the top opening when folded inwards.

17. The cup according to claim 15, wherein the cutout is C-shaped or U-shaped.

18. A cup having an integrated lid, the cup comprising:

a base;

a wall extending from the base to enclose the base, the wall defining a top opening opposite the base, and the wall including a first longitudinal edge and a second longitudinal edge; and at least two closure flaps extending beyond the top opening and connected to the wall by a fold line, wherein the at least two closure flaps are foldable inwards about the fold line to at least partially cover the top opening, a first force being required to fold a first closure flap inwards and a second force being required to fold a second closure flap inwards, wherein the wall is formed by overlapping the first longitudinal edge and the second longitudinal edge to create a seam intersecting the at least one closure flap, and wherein at least one of the first longitudinal edge or the second longitudinal edge is configured such that the first force is substantially equal to the second force.

19. The cup according to claim 18, wherein the at least two closure flaps include four closure flaps.

20. The cup according to claim 18, wherein the top opening defines a substantially rectangular opening.

* * * * *